United States Patent [19]

Ihara et al.

[11] Patent Number: 5,401,975

[45] Date of Patent: Mar. 28, 1995

[54] METHOD FOR CONSTRUCTING A CARBON MOLECULE AND STRUCTURES OF CARBON MOLECULES

[75] Inventors: Sigeo Ihara, Tokorozawa; Satoshi Itoh, Kodaira, both of Japan

[73] Assignee: Hitachi, Ltd., Tokyo, Japan

[21] Appl. No.: 105,039

[22] Filed: Aug. 11, 1993

[30] Foreign Application Priority Data

Aug. 20, 1992 [JP] Japan .................................. 4-221238

[51] Int. Cl.$^6$ .............................................. G21G 5/00
[52] U.S. Cl. ................................................ 250/492.3
[58] Field of Search ................... 250/492.3, 492.1, 306, 250/307; 204/155, 173; 423/446; 369/126

[56] References Cited

PUBLICATIONS

Kroto, H. W., et al. "C$_{60}$: Buckminsterfullerene," Nature, vol. 318, Nov. 14, 1985, pp. 162–163. (English).
Iijima, Sumio. "Helical Microtubules of Graphitic Carbon," Nature, vol. 354, Nov. 7, 1991, pp. 56–58. (English).
Vanderbilt, David, et al. "Negative-Curvature Fullerene Analog of C$_{60}$," The American Physical Society, vol. 68, No. 4, Jan. 27, 1992, pp. 511–513. (English).

Primary Examiner—Paul M. Dzierzynski
Assistant Examiner—Kiet T. Nguyen
Attorney, Agent, or Firm—Fay, Sharpe, Beall, Fagan, Minnich & McKee

[57] ABSTRACT

Carbon atoms are arranged stably in the form of a torus or in the form of a helical coil to give novel topological properties to the carbon atoms to thereby provide various functions of carbon molecules. A plurality of sixfold rings each including six carbon atoms are arranged in the form of a torus, and then these sixfold rings are partially replaced by fivefold and sevenfold rings to obtain a stable structure. That is, a part of the outer wall surface of a torus constituted by a plurality of sixfold rings and a part of the inner wall surface of the torus are replaced by fivefold rings and sevenfold rings respectively to obtain a stable structure. Further, a molecule in which carbon atoms are arranged to form a toroidal or helically-coiled stable structure or a cluster in which a plurality of such molecules are arranged spatially is constructed by using an STM. Further, a micro part or device using the hole of the torus/helical coil and the inside of the ring thereof is formed by combining a plurality of such molecules/clusters.

28 Claims, 31 Drawing Sheets

F I G. 2
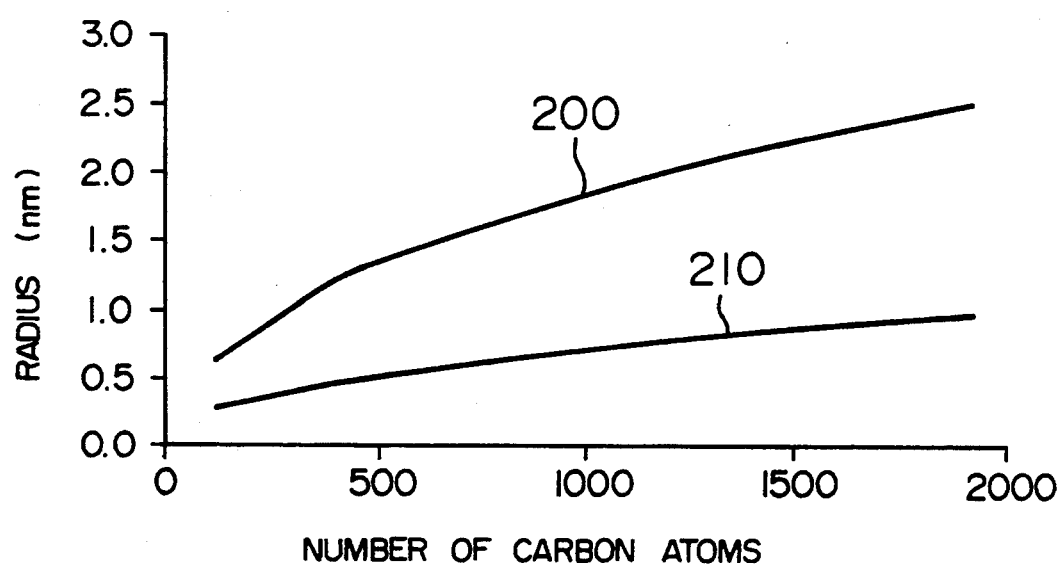

F I G. 12
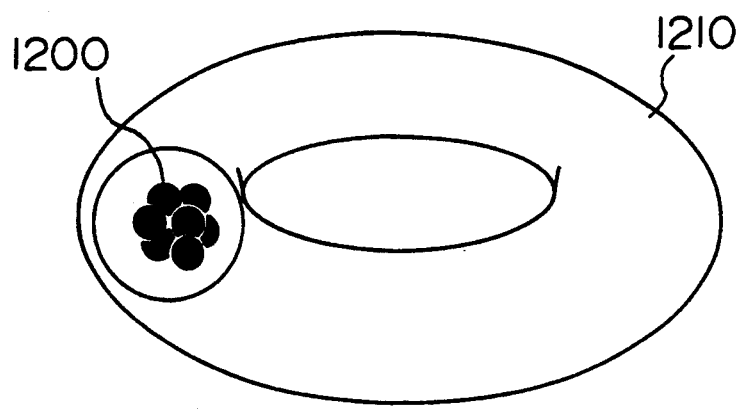
F I G. 13
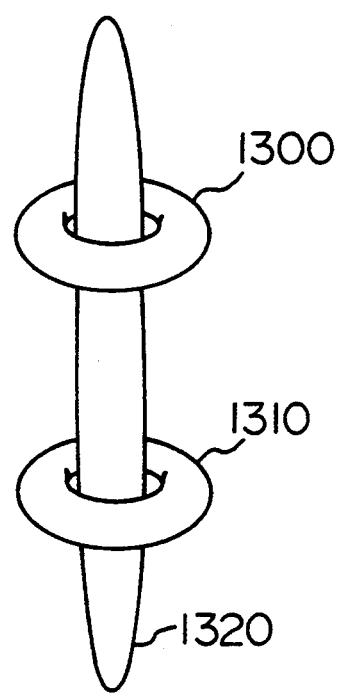

F I G. 14
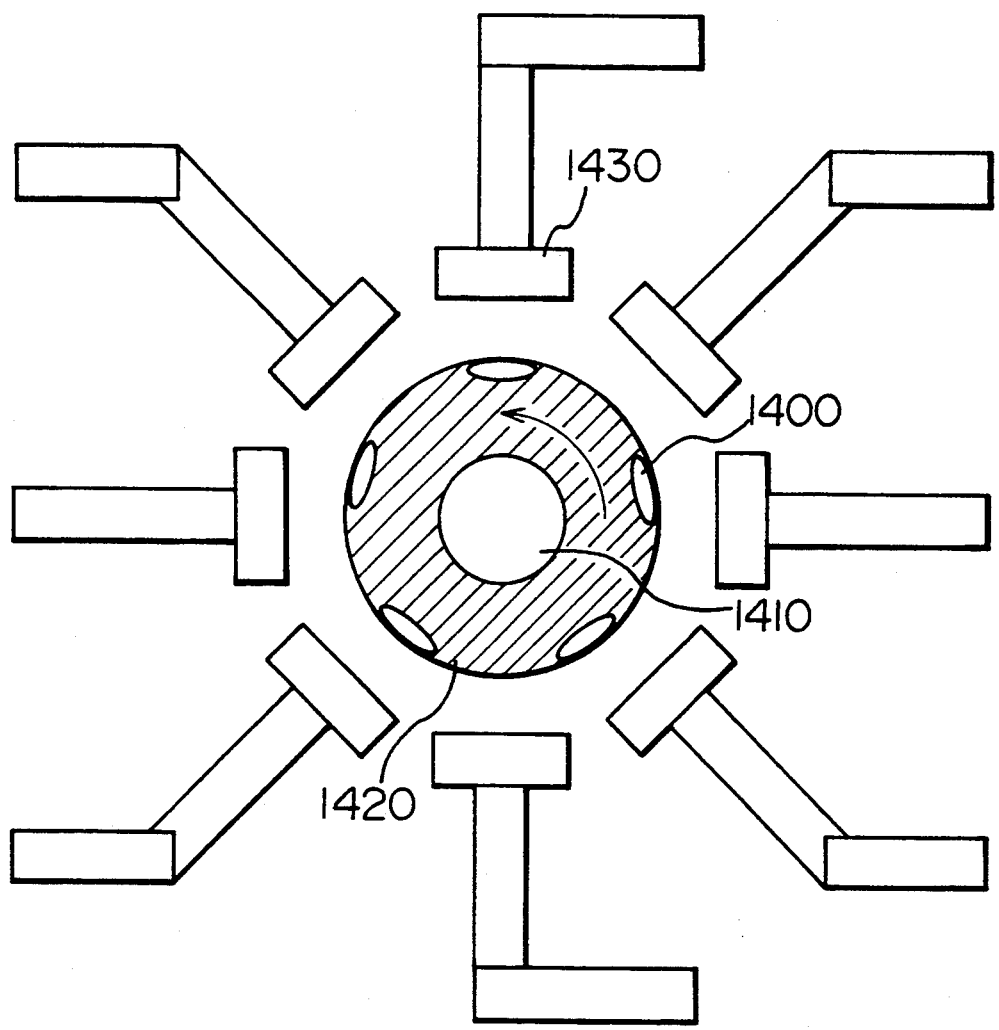

FIG. 25
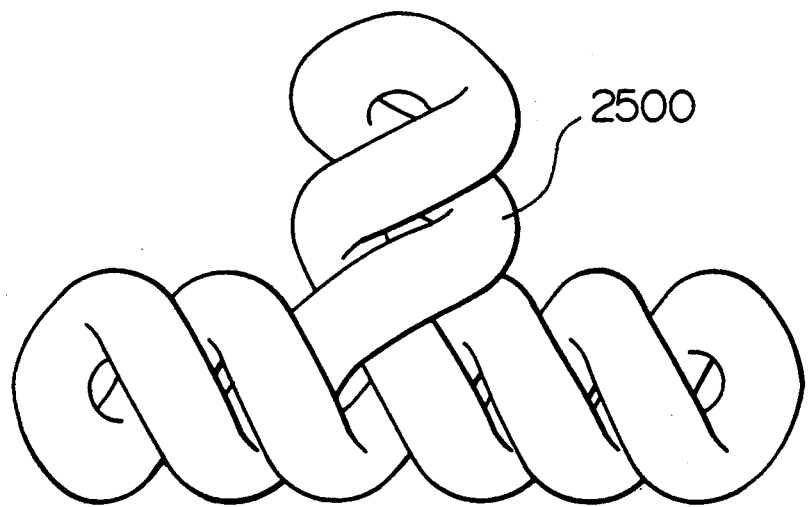
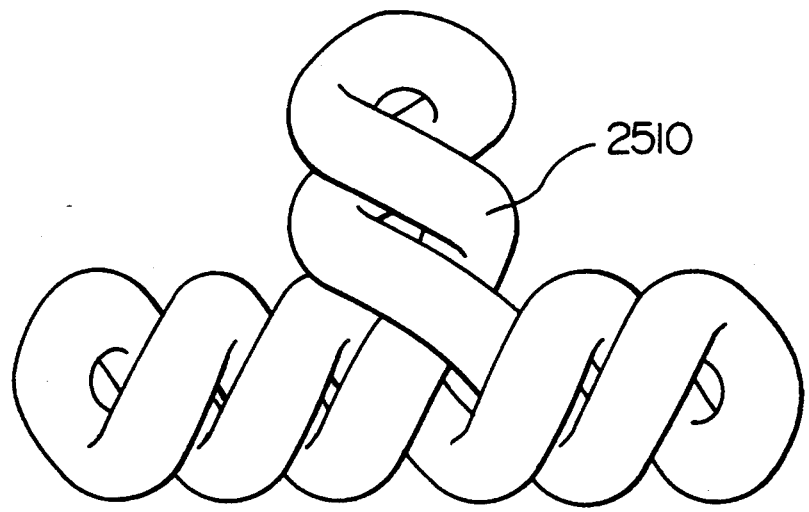

2600  2610

FIG. 27
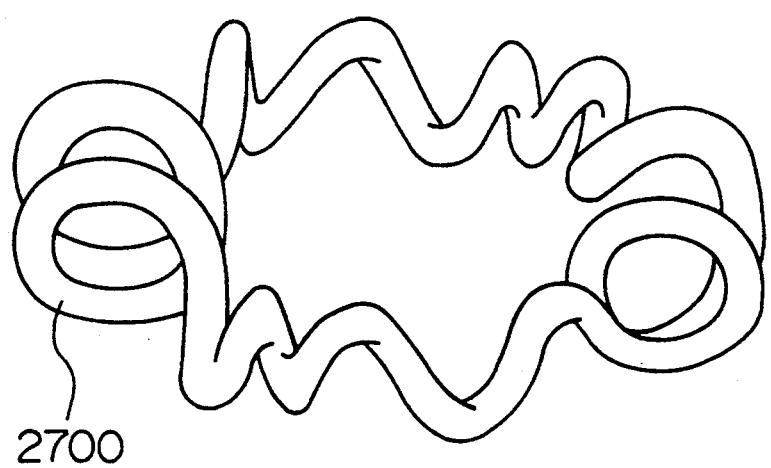
2700
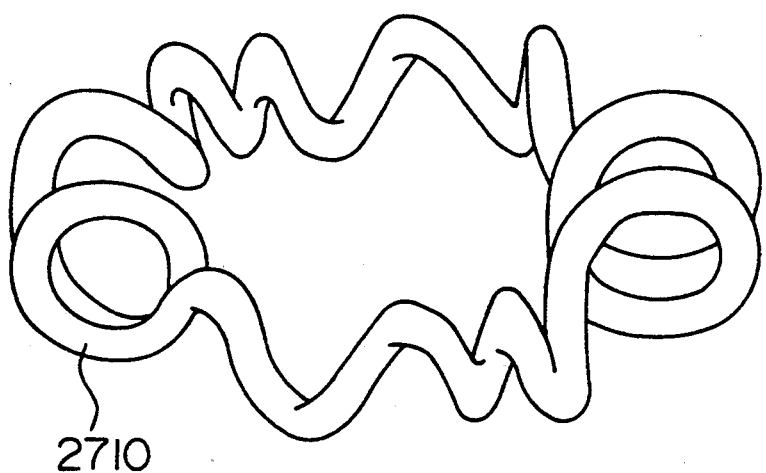
2710

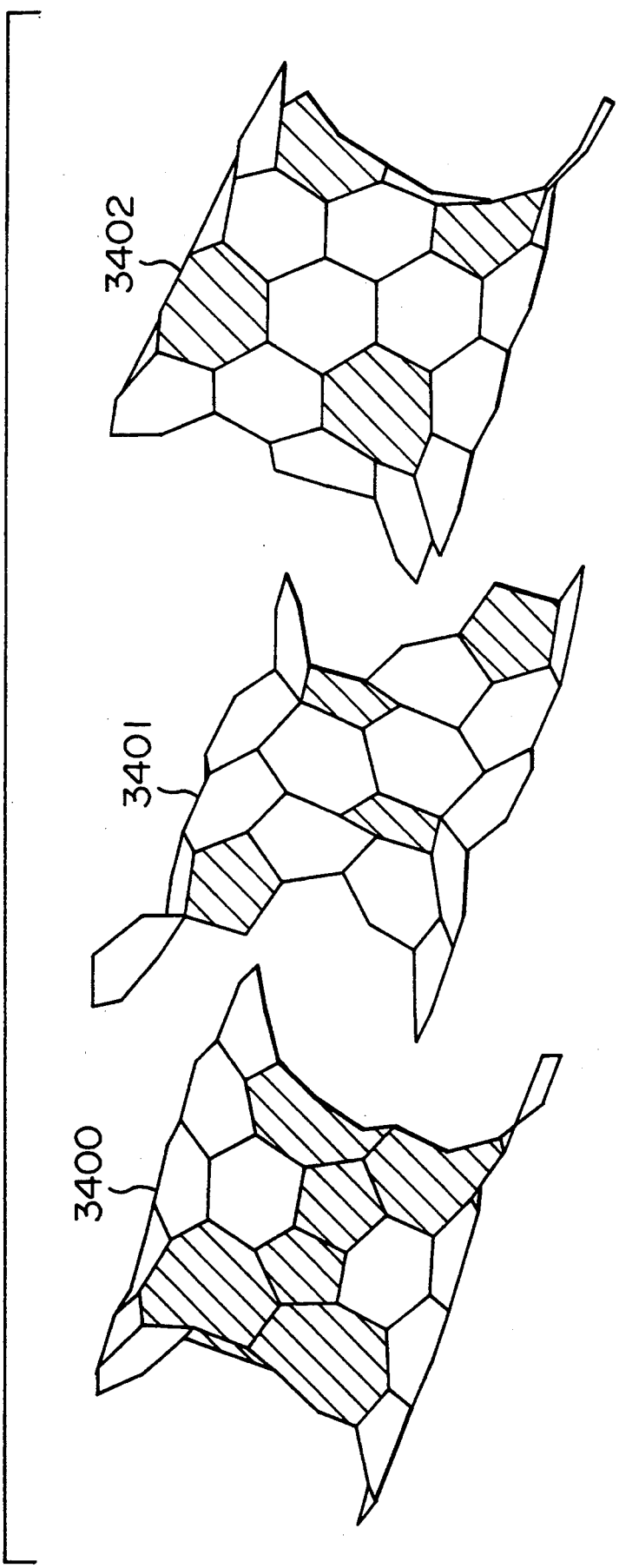

FIG. 37
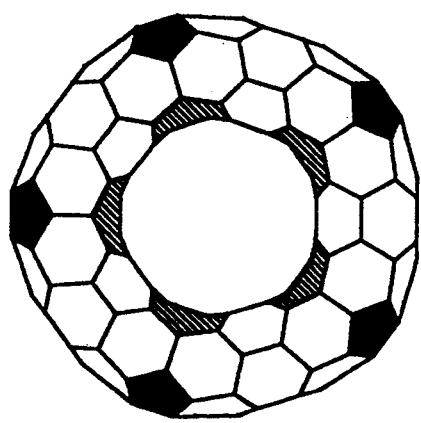
Pat0
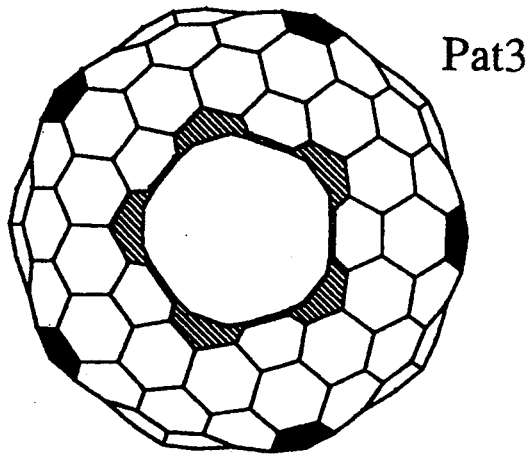
Pat3
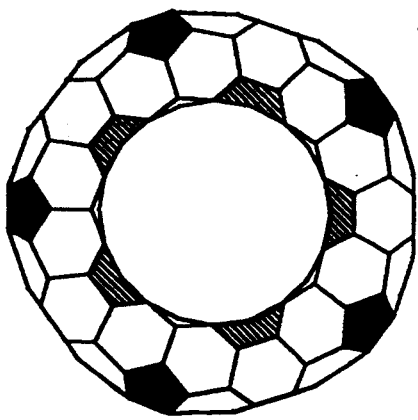
Pat1
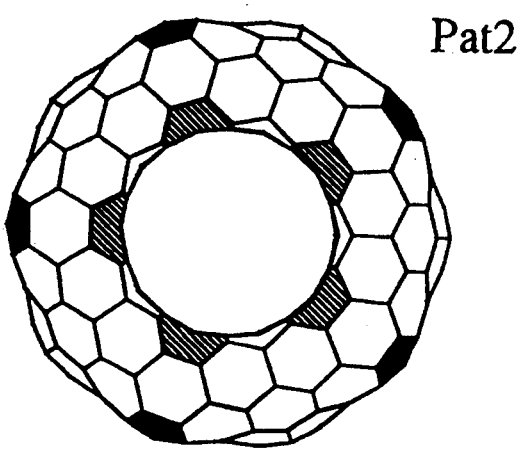
Pat2
■ FIVEFOLD RING
▨ SEVENFOLD RING

METHOD FOR CONSTRUCTING A CARBON MOLECULE AND STRUCTURES OF CARBON MOLECULES

BACKGROUND OF THE INVENTION

The present invention relates to a molecular structure of carbon atoms and a cluster of carbon molecules and a method for constructing the same.

As conventional molecular structures of carbon atoms, there are known diamond, graphite and soot. Recently there are further known a series of buckminsterfullerene molecules found by H. W. Kroto et al. and described in Nature, Vol. 318, pp. 162–163, 1985, and carbon nano-tubes found by Iijima and described in Nature, Vol. 354, pp. 56–58, 1991. Each of these carbon molecules is constructed in the form of a carbide compound. As proposed by David Vanderbilt and J. Tersoff and described in Phys. Rev. Lett., Vol. 68, pp. 511–513, 1992, there is known the fact that a material constituted by carbon atoms arranged on a periodic minimum plane exists theoretically.

In the molecular structures proposed in the prior art, mechanically sufficient strength cannot be obtained and hence there arises a problem that the molecular structures cannot be applied to any dynamic mechanical element. It has been thought of that a structure in which carbon atoms are arranged in the form of a torus is suitable for solution of the problem. There has not been, however, any proposal of a stable structure of a cluster of carbon atoms arranged in the form of a torus. On the other hand, although a cluster of carbon atoms having a cylindrically helical structure has been proposed, there has not been any proposal of a helical structure having mechanically sufficient strength.

SUMMARY OF THE INVENTION

An object of the present invention is to provide a structure having mechanically sufficient strength and also thermodynamical stability at high temperature obtained by giving novel topological properties to a cluster of carbon atoms to thereby make it possible to be adapted to a dynamic mechanical element, and also provide a method for constructing the structure.

In addressing the foregoing object, according to the present invention, a cluster of carbon atoms is formed by arranging carbon atoms stably in the form of a torus so that novel topological properties are given to carbon atoms. According to the present invention, a plurality of sixfold rings each consisting of six carbon atoms are arranged in the form of a torus, whereafter these sixfold rings are partially replaced by fivefold and sevenfold rings to obtain a stable structure. That is, a part of the outer wall surface of a torus constituted by a plurality of sixfold rings and a part of the inner wall surface of the torus are replaced by fivefold rings and sevenfold rings respectively to obtain a stable structure.

Because the cluster of carbon atoms according to the present invention is toroidal, mechanically sufficient strength can be obtained so that a dynamic mechanical element can be formed by using the hole of the torus and the inside of the torus.

BRIEF DESCRIPTION OF THE DRAWINGS

FIGS. 1(A) to 1(D) are diagrams showing a molecular structure according to an embodiment of the present invention;

FIG. 2 is a graph showing the change of the radius of a toroidal molecule with respect to the number of constituent atoms;

FIG. 12 is a diagram showing an impurity molecule-size capsule of a toroidal molecule;

FIG. 13 is a diagram showing a wheel constituted by toroidal molecules and a carbon tube;

FIG. 14 is a diagram showing a rotor of a toroidal molecule;

FIG. 25 is a diagram showing positively and negatively coiled super helical structures;

FIG. 27 is a diagram showing positively and negatively coiled super helical structures;

FIG. 37 is a diagram showing molecular structures different in orientation of fivefold and sevenfold rings in a torus C$_{240}$.

DESCRIPTION OF THE PREFERRED EMBODIMENT

Figure 34:
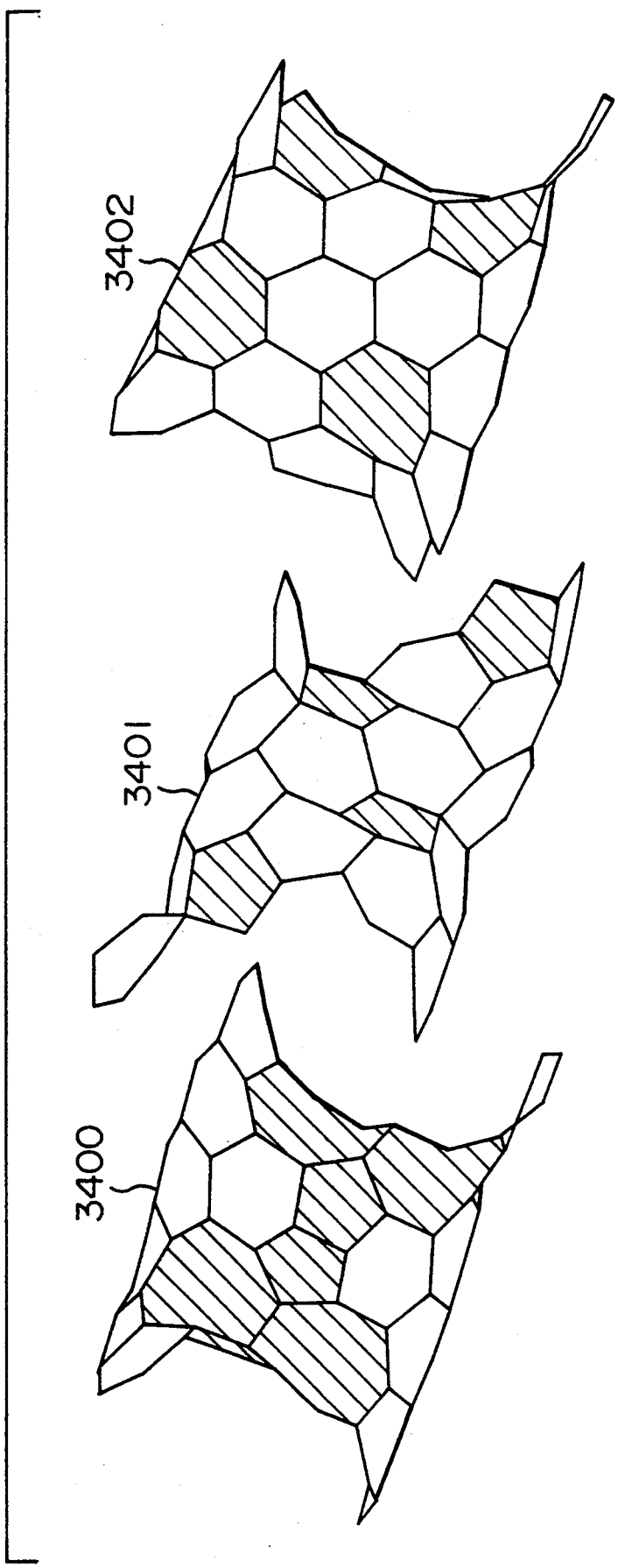
FIG. 34 is a diagram showing various patterns of the inside of C$_{360}$.

An embodiment of the present invention will be described below. In the following description, a carbon atom cluster is abbreviated to "C$_n$" in accordance with the number n of atoms contained therein on the unit structure.

FIG. 1 is a view of a molecular structure of carbon atoms constructed according to the present invention. FIG. 1(A) is a top view of a toroidal molecule 100 which includes carbon atoms. The toroidal molecule 100 has an outer diameter of 2.26 nm and an inner diameter of 0.78 nm. The toroidal molecule 100 has a surface on which carbon atoms are bonded in a network manner. Accordingly, respective carbon atoms are located at the intersections of lines shown in FIG. 1(A). The structure shown as an example in FIG. 1 is constructed by 360 carbon atoms. FIG. 1(B) shows a crosssection 130 of the toroidal molecule 100. In FIG. 1(B), the right side of the crosssection shows an outer wall surface, and the left side of the crosssection shows an inner wall surface. FIG. 1(C) shows the outer wall surface 140 of the toroidal molecule 100, and FIG. 1(D) shows the inner wall surface 150 thereof. The toroidal molecule 100 has: ten sevenfold carbon rings 160 shown in FIG. 1(D) which are alternately arranged at upper and lower positions on the inner wall surface; ten fivefold carbon rings 110 shown in FIG. 1(C) which are alternately arranged at upper and lower positions on the outer wall surface in correspondence with the sevenfold carbon rings; and 160 sixfold carbon rings 120 having a structure similar to the graphite structure as shown in FIG. 1(A) which are arranged on positions of the surface other than those where the fivefold and sevenfold rings are arranged. Each sixfold ring 120 is shaped like a regular hexagon, and the nearest inter-bond distance is about 0.145 nm. The crosssection 130 of the torus of the molecule 100 is shaped like a circle.

According to structure analysis by using a method of examining thermal stability of the structure on the assumption of presence of a potential between atoms on the basis of molecular dynamics, it is confirmed that the toroidal carbon molecule structure is stable even at a temperature of 2000° K. Furthermore, cohesive energy is −7.4 eV per one atom at cryogenetic temperatures, which is the same value as the cohesive energy, −7.4 eV, per one atom in the graphite structure and as the cohesive energy, −7.4 eV, per one atom in a stable spheroidal molecule structure including 60 atoms and called "buckminsterfullerene". Accordingly, the toroidal molecule exists stably.

By adjusting the number of sixfold carbon rings 120 other than the fivefold and sevenfold rings 110 and 160, a toroidal molecule of 120, 480, 1080, 1440 or 1920 carbon atoms can be constructed as well as the molecular structure shown in FIG. 1. The number N of atoms constituting one toroidal molecule is generally equal to a value obtained by multiplying 120 or 80 by 3$^n$ and further by 4$^m$ in which n and m represent integers being non-negative. In any case, the cohesive energy takes a value near to −7.4 eV, so that the toroidal molecule exists stably. According to a result of simulation, the relation between the inner radius of the torus and the number of atoms and the relation between the outer radius of the torus and the number of atoms are expressed in the curves 210 (inner radius) and 200 (outer radius) in FIG. 2, so that the respective radii increase as the number of atoms increases.

Figure 31:
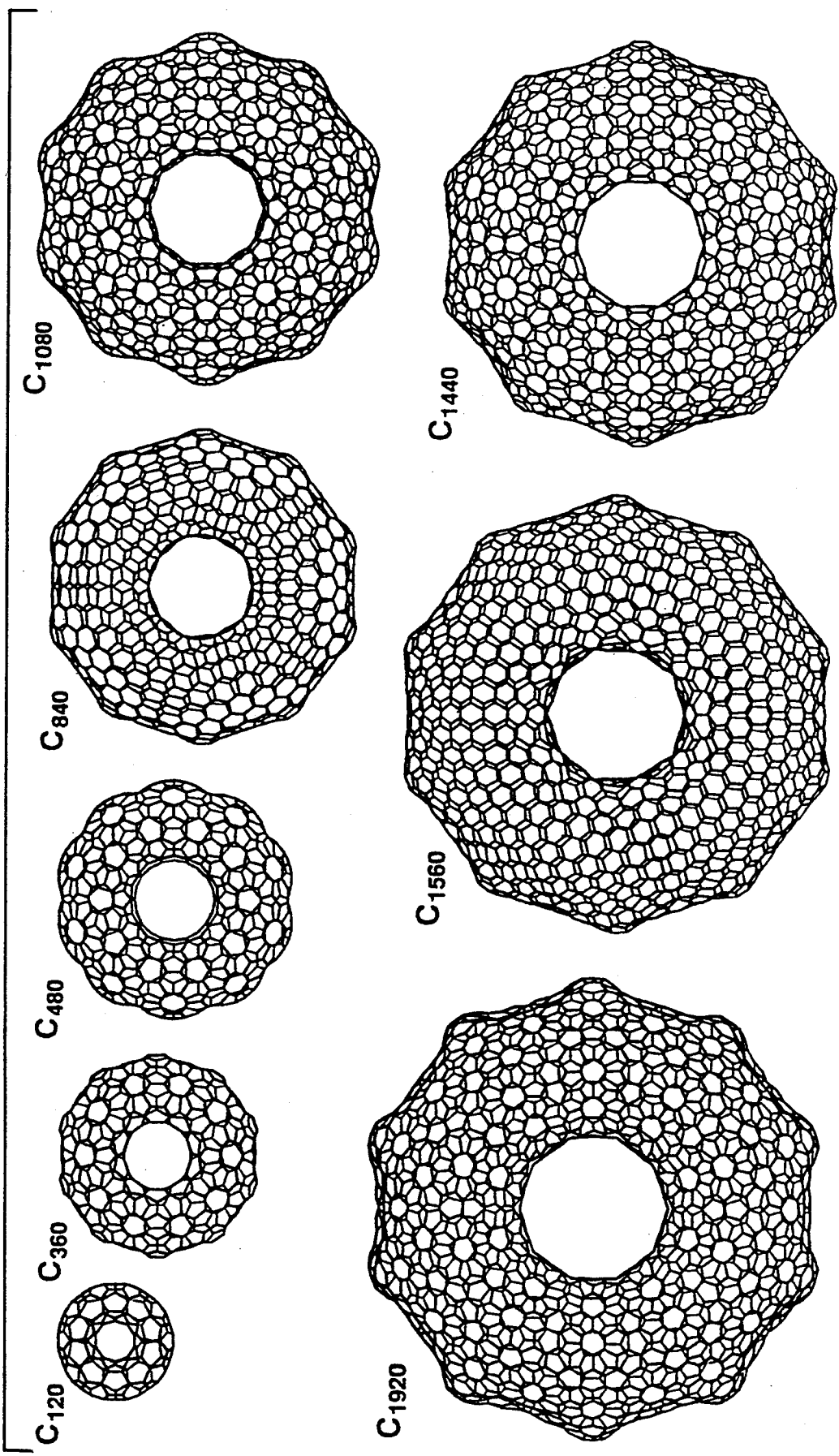
FIG. 31 is a diagram showing expansions of a torus $C_{360}$ in the same system.
Figure 35A:
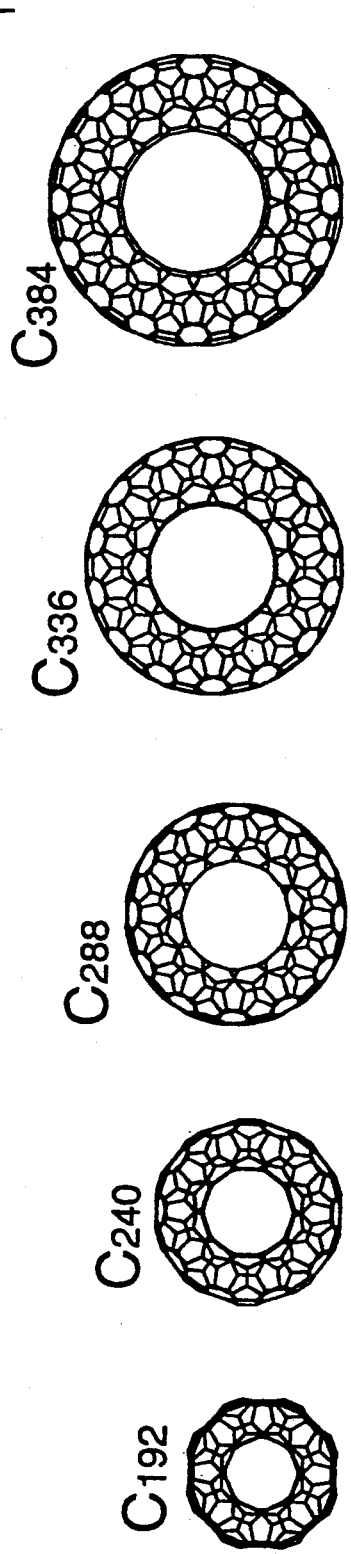
FIGS. 35(A), 35(B) and 35(C) are diagrams showing various rotation symmetry of C$_{240}$, C$_{360}$ and C$_{540}$.
Figure 35B:
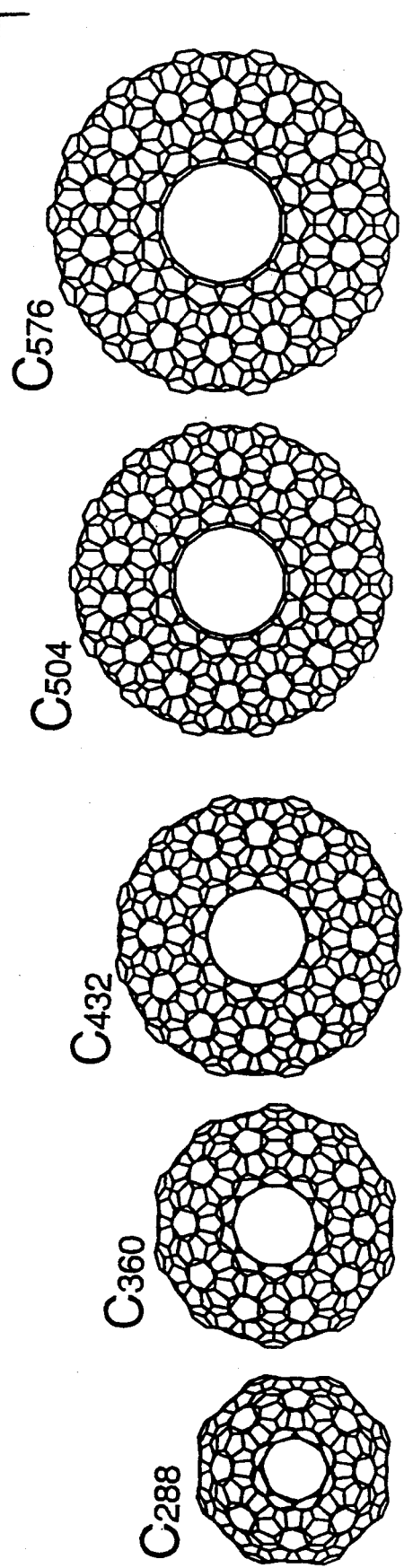
Figure 35C:
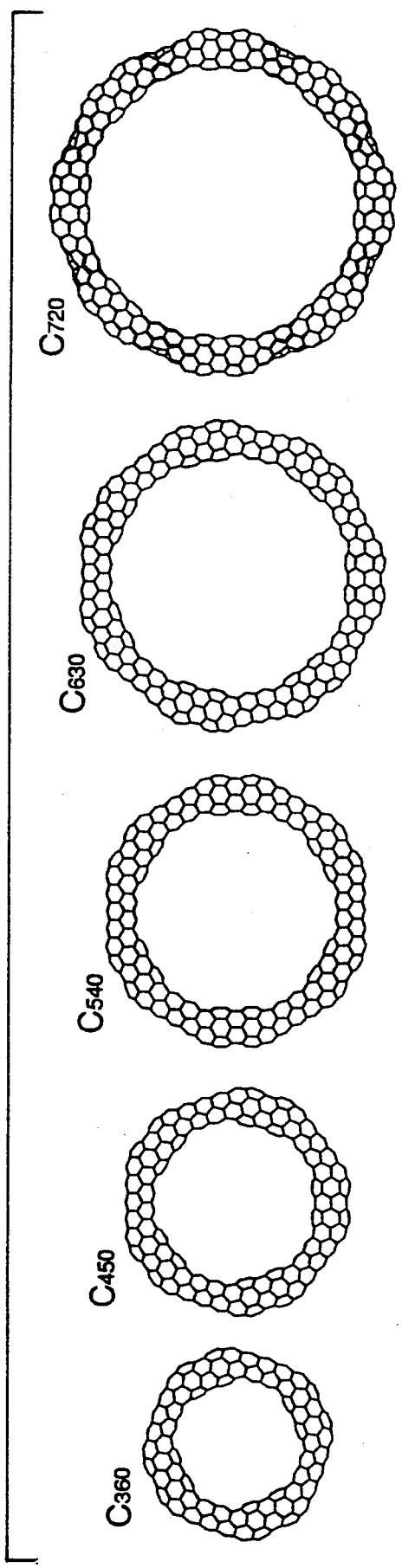
Figure 36:
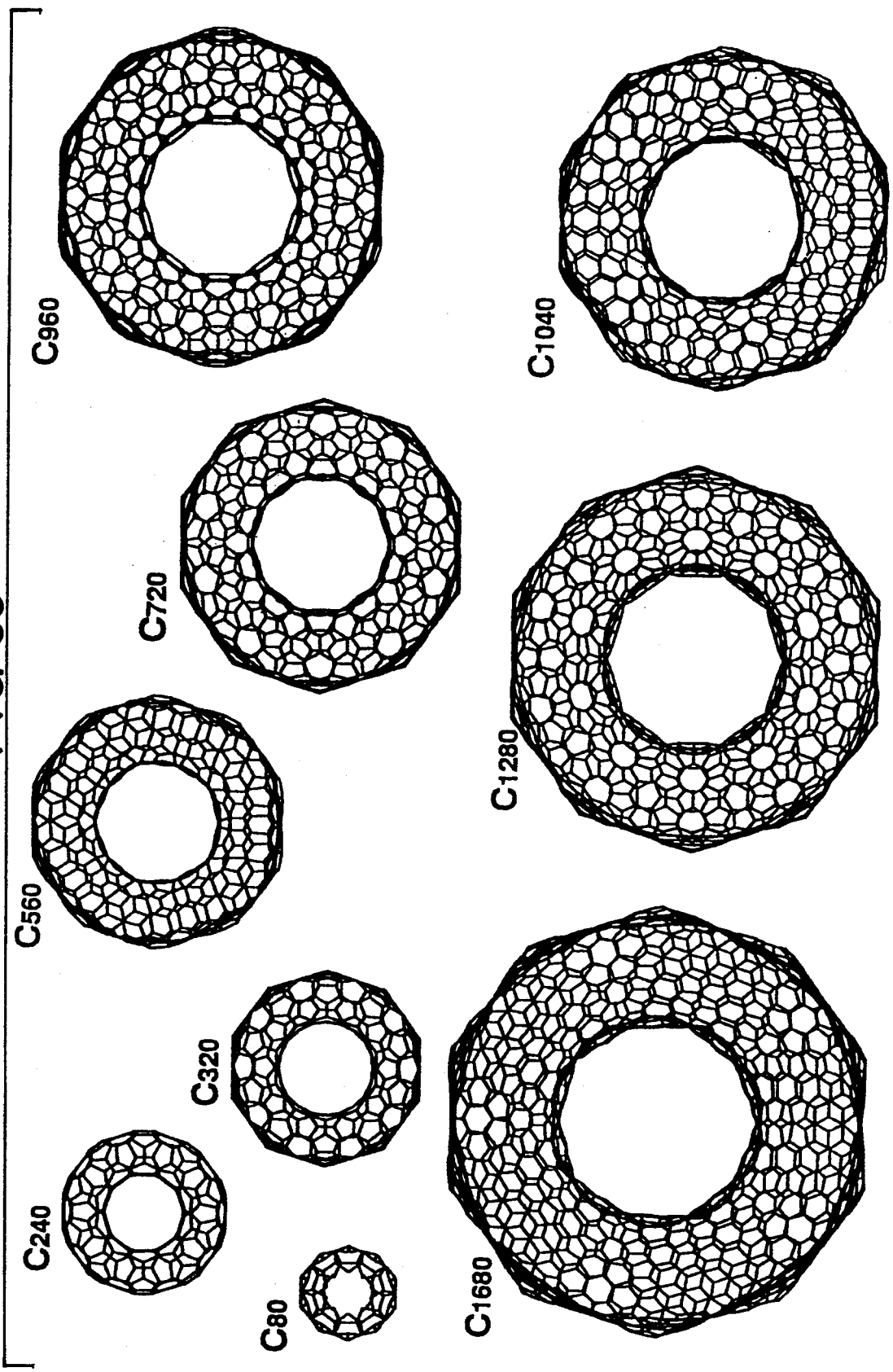
FIG. 36 is a diagram showing the expansions of a torus C$_{240}$ in the same system.

Expansions in the same systems of C$_{360}$ and C$_{240}$ having 360 and 240 atoms among the respective numbers of atoms expressed in the axis of abscissa of FIG. 2 are shown in FIGS. 31 and 36. The respective numbers N of atoms constituting tori shown in FIGS. 31 and 36 are expressed by the following equations:

$$\{C_{360} \text{ (FIG. 31)}\} N = 120 \times (n^2 + nm + m^2)$$

$$\{C_{240} \text{ (FIG. 36)}\} N = 80 \times (n^2 + nm + m^2)$$

in which n, m ≧ 0 (n=m≠0). Further, as shown in FIGS. 35(A) and 35(B), toroidal molecules having various rotational (symmetrical) axes can be formed from C$_{240}$ of FIG. 36 and from C$_{360}$ in FIG. 31. The respective numbers N of atoms constituting the toroidal molecules shown in FIGS. 35(A) and 35(B) are expressed by the following equations:

$$\{C_{360} \text{ (FIG. 35(A))}\} N = 48 \times n$$

$$\{C_{240} \text{ (FIG. 35(B))}\} N = 72 \times n$$

in which n = 4, 5, 6, 7, 8. Each toroidal molecule shown in FIGS. 35(A) and 35(B) has rotation symmetry of 2n. That is, when each of the toroidal molecules is rotated by 180/n degrees, the structure thereof coincides with the original structure thereof. Similarly, as shown in FIG. 35(C), various rotation-symmetrical toroidal molecules can be formed from C$_{540}$. The respective numbers N of atoms constituting respective toroidal molecules shown in FIG. 35(C) are expressed by the following equation:

$$\{C_{540} \text{ (FIG. 35(C))}\} N = 90 \times n$$

in which n = 4, 5, 6, 7, 8. Each toroidal molecule shown in FIG. 35(C) has rotation symmetry of n. That is, when the toroidal molecule is rotated by 360/n degrees, the structure thereof coincides with the original structure thereof.

Even in the case where the number of carbon atoms is the same, molecular structures whose orientation of fivefold and sevenfold rings are different, can be formed. FIG. 37 shows such molecular structures whose orientation of fivefold and sevenfold rings in the torus are different, although those numbers of atoms are 240. In Pat.0 and Pat.1 of FIG. 37, one of the vertexes of each fivefold ring is oriented toward the center of the torus but Pat.0 and Pat.1 are different in the arrangement of sevenfold rings relative to fivefold rings. Similarly, in Pat.2 and Pat.3 of FIG. 37, one of the vertexes of each fivefold ring is oriented to be substantially perpendicular to a plane of FIG. 37 but Pat.2 and Pat.3 are different in the arrangement of sevenfold rings relative to fivefold rings.

Figure 3:
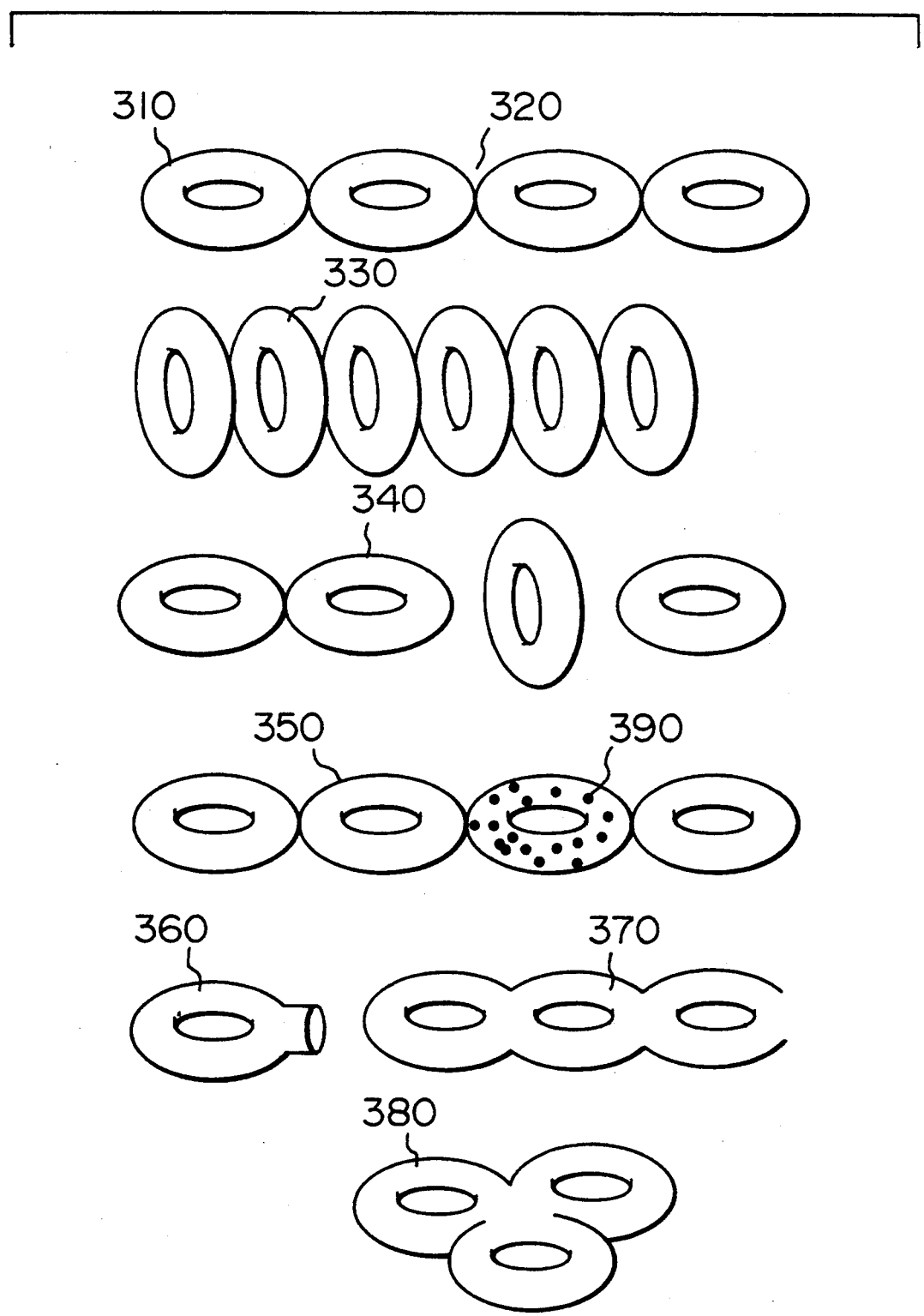
FIG. 3 is a diagram showing sets of toroidal molecules.

Interaction energy between carbon molecules, including toroidal molecules, is generally expressed by attraction potential being in inverse proportion to the sixth power of the distance between molecules. Interaction between atoms in each molecule is sufficiently strong. Accordingly, interaction between the molecules is sufficiently weaker than that between the atoms, so that the molecule is not decomposed because of other molecules near thereto. Thus, as shown in FIG. 3, structures 320, 330, 340 and 350 in which toroidal molecules are arranged one-dimensionally can be formed. The position of each of constituent atoms however changes by not larger than about 0.05 nm, because of the presence of near other molecules. Therefore, the bonding properties between the atoms in each molecule change more or less, so that potential energy changes in accordance with the change of the bonding properties. As a result, dynamic characteristics such as tensile strength, etc. and the energy band structure of electrons/holes change, so that electric characteristic changes.

Particularly one-dimensional dynamic characteristics and electric characteristics can be controlled by arranging carbon molecules on a plane as shown in the arrangement 320 in FIG. 3 or by arranging carbon molecules to face ring-surfaces each other as shown in the arrangement 330 in FIG. 3. Alternatively, one-dimensional dynamic characteristics and electric characteristics can be modulated spatially by inserting a toroidal molecule vertically or obliquely in the arrangement 320 of carbon molecules on a plane, as shown in the arrangement 340 in FIG. 3. Furthermore, these characteristics can be controlled by forming a one-dimensional large molecule by a combination of the arrangements 320, 330 and 340 shown in FIG. 3. For example, a low dimensional structure such as a one- or two-dimensional structure can be formed by making buckminsterfullerene molecules adsorbed onto the surface (100) of Si. Because the local molecular arrangement of the toroidal molecules shown in FIG. 3 is similar to that of the buckminsterfullerene molecules, such a low dimensional structure can be formed of the toroidal molecules in the same manner as described above. That is, even in the case where impurities 390 are adsorbed onto a part of the toroidal molecules, as shown in the arrangement 350 in FIG. 3, the same change as in the arrangement 340 can be provided. Because the energy band structure of an impurity-adsorbed toroidal molecule with adsorbed atoms such as alkaline metal atoms, boron atoms, nitrogen atoms, etc. onto a toroidal molecule is different from that of a toroidal molecule constituted by only the carbon atoms, the dynamic characteristics of the impurity-adsorbed toroidal molecule and the electric characteristics thereof change according to the absorbed atoms so that the impurity-adsorbed toroidal molecule can act as a metal, an insulator or a semiconductor. By arranging such impurity toroidal molecules one-dimensionally and changing the arrangement thereof as described above, the characteristics of the whole system change. This can be applied to both the two-dimensional case and the three-dimensional case. Further, by removing a toroidal molecule from a position where the toroidal molecule is to be disposed or contrariwise by providing a toroidal molecule additionally, the dynamic characteristic and the electric characteristic can be changed spatially.

Because also a molecular structure formed by combining a cylindrical carbon nano-tube with a toroidal molecule as shown in the carbon molecule 360 in FIG. 3 has cohesion energy substantially equal to that of buckminsterfullerene, the molecular structure can be formed easily. Similarly, a toroidal one-dimensional molecule 370 in which toroidal molecules are not connected by weak inter-molecular force but connected by inter-atom covalent bonding as shown in the one-dimensional molecule 370 in FIG. 3, and a torus-chain molecule 380 can be formed.

The above-mentioned molecules 370 and 380 can be formed by radiating a laser beam onto a connection portion or applying arc discharge thereto after bringing a plurality of molecules close to one another. Although FIG. 3 shows the case where each of the molecules 370 and 380 is formed as one large molecule by combining three molecules strongly, it is a matter of course that a larger number of molecules can be combined in the same manner as described above.

Figure 4A:
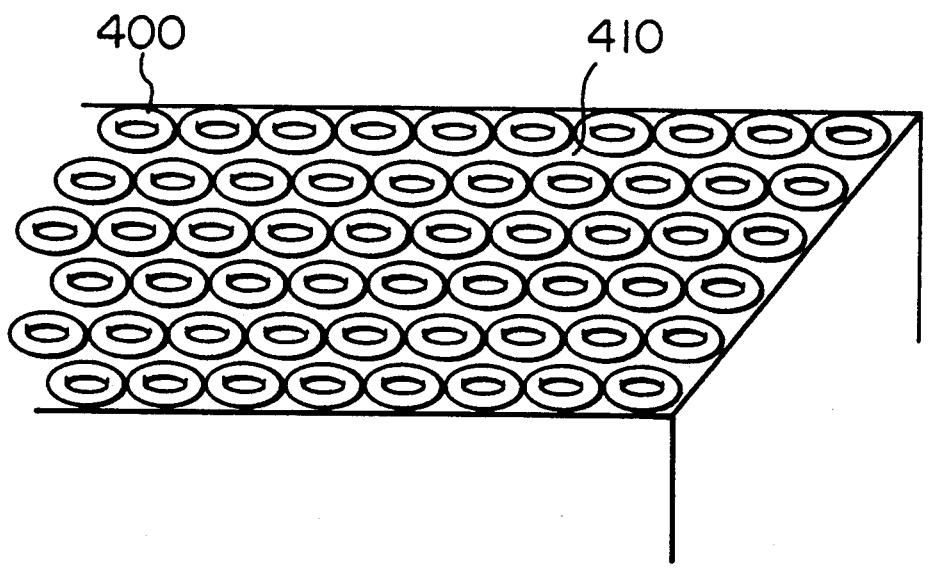
FIGS. 4(A) and 4(B) are diagrams showing two-dimensional structures including toroidal molecules.
Figure 4B:
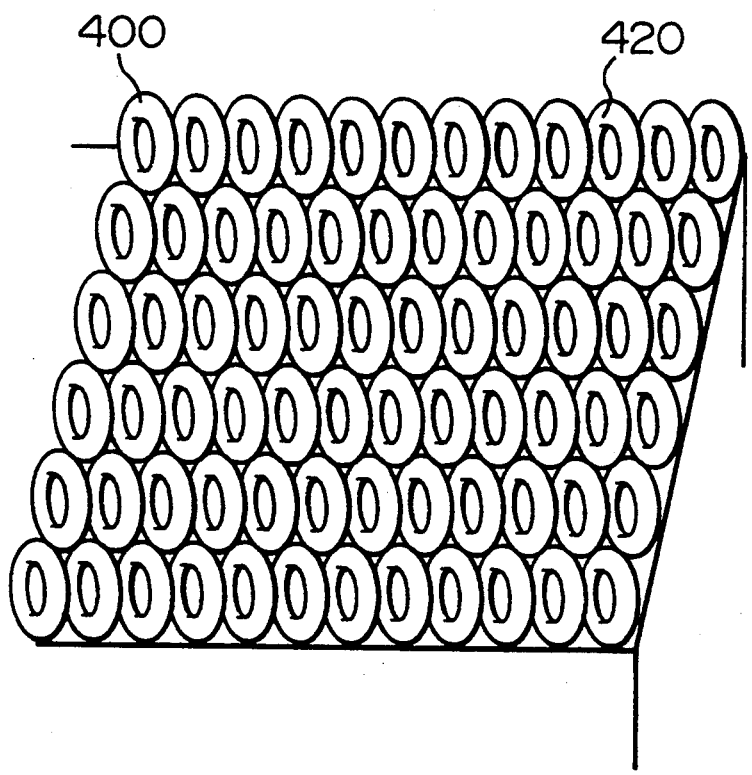

FIG. 4 shows an example in which toroidal carbon molecules 400 are arranged two-dimensionally. Because inter-molecular potential can be expressed by attraction potential being in inverse proportion to the sixth power of inter-molecular distance, a structure being stable against thermal fluctuation can be obtained if the respective toroidal molecules are arranged so that the respective centers of tori coincide with the vertexes of a triangle. As is obvious from comparison of the two-dimensional arrangement 410 of toroidal molecules shown in FIG. 4(A) with the two-dimensional arrangement 420 of toroidal molecules shown in FIG. 4(B), the coefficient of inter-molecular potential in the arrangement 420 is smaller than that in the arrangement 410. Accordingly, the inter-molecular distance in the arrangement 420 is smaller than that in the arrangement 410. Accordingly, the atomic density changes according to the arrangement of toroidal molecules as to whether the arrangement 410 is selected or whether the arrangement 420 is selected. Also in the arrangements shown in FIG. 4, two-dimensionally spread giant torus molecules or crystals such as the molecules 370 and 380 in FIG. 3 in which molecules are not connected by weak inter-molecular force but connected by strong inter-atom covalent bonding force can be formed by laser radiation or arc discharge.

Because potential energy and the energy band structure of electrons/holes change in accordance with the above-mentioned two-dimensional structure, the dynamic characteristic and the electric characteristic are modulated spatially. Further, the dynamic characteristic and the electric characteristic can be changed spatially by removing a toroidal molecule from a position where the toroidal molecule is to be disposed or contrariwise by providing a toroidal molecule additionally. Further, because potential energy and the energy band structure of electrons/holes are changed if impurity toroidal molecules each formed by adsorbing atoms such as alkaline metal atoms, boron atoms, nitrogen atoms, etc. onto a toroidal molecule in the same manner as described above are arranged as a stratified formation and the method of the arrangement thereof is changed, the dynamic characteristic and the electric characteristic are modulated spatially.

Figure 5:
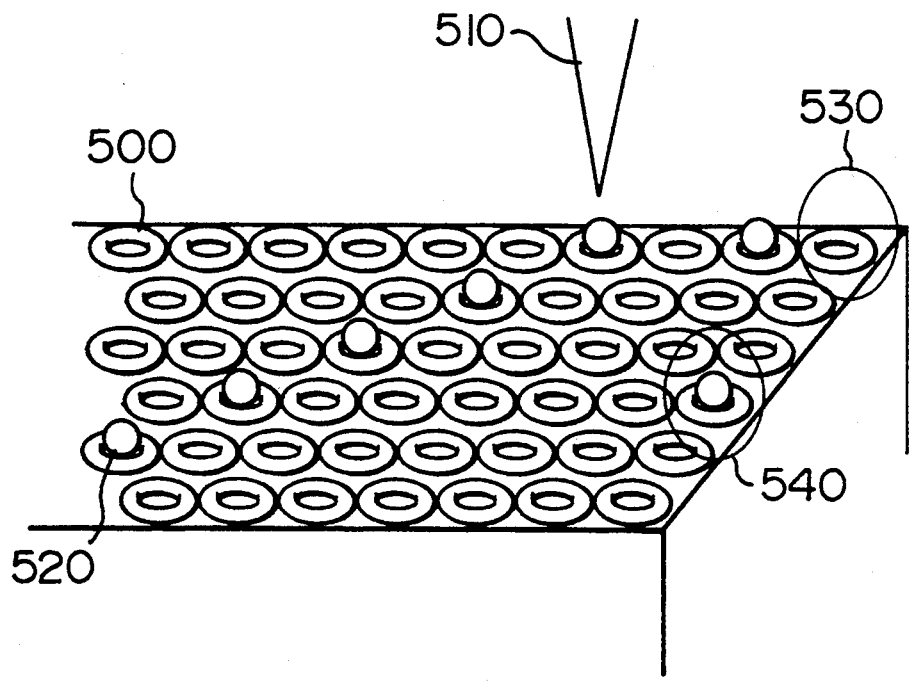
FIG. 5 is a diagram showing a storage device using a cluster of two-dimensional structures including toroidal molecules.

As shown in FIG. 5, buckminsterfullerene molecules or spheroidal carbon molecules 520 may be arranged in holes of two-dimensionally arranged toroidal carbon molecules 500, by using a probe 510, which is applied with a voltage or current, of a scanning tunneling microscope (hereinafter referred to as "STM") so that bit information in a hole-blocking state as shown in the state 540 and bit information in a hole-free state as shown in the state 530 are made to correspond to "1" and "0" respectively to make it possible to store information.

Figure 6:
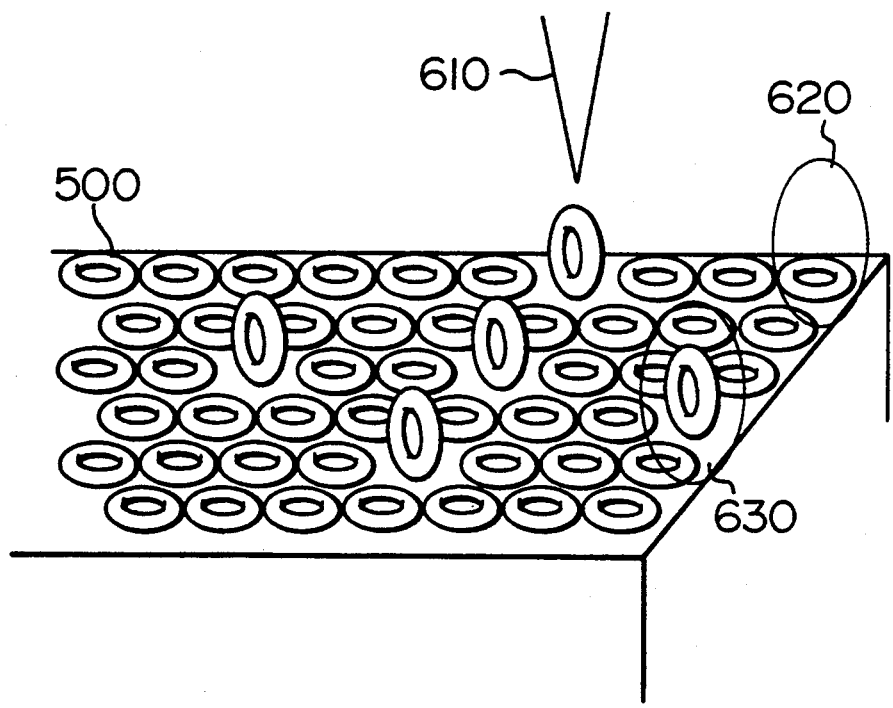
FIG. 6 is a diagram showing a storage device using a cluster of toroidal molecules.

As shown in the states 620 and 630 in FIG. 6, a part of toroidal molecules 500 instead of spheroidal atoms/-molecules may be arranged vertically by using a probe 610 of a STM so that the state of absence of vertical molecules and the state of presence of vertical molecules are made to correspond to bit "1" and bit "0" respectively. As shown in FIG. 6, because the state of the arrangement of molecules is kept constant even at an ordinary temperature if molecules to be arranged are sufficiently large, information is stored in accordance with the state of the arrangement thereof. Writing and reading of information can be realized easily by using the STM. Further, the vertical toroidal molecules may be arranged two-dimensionally so that information can be stored in accordance with the orientation of the toroidal molecules. When, for example, the orientation of molecules in the state 630 and the orientation perpendicular thereto are made to correspond to "1" and "0" respectively, the energy required for writing and reading of information can be reduced. In the arrangement shown in the state 630 in FIG. 6, however, operation at a low temperature is required because the fluctuation of orientation caused by heat is large.

Figure 7:
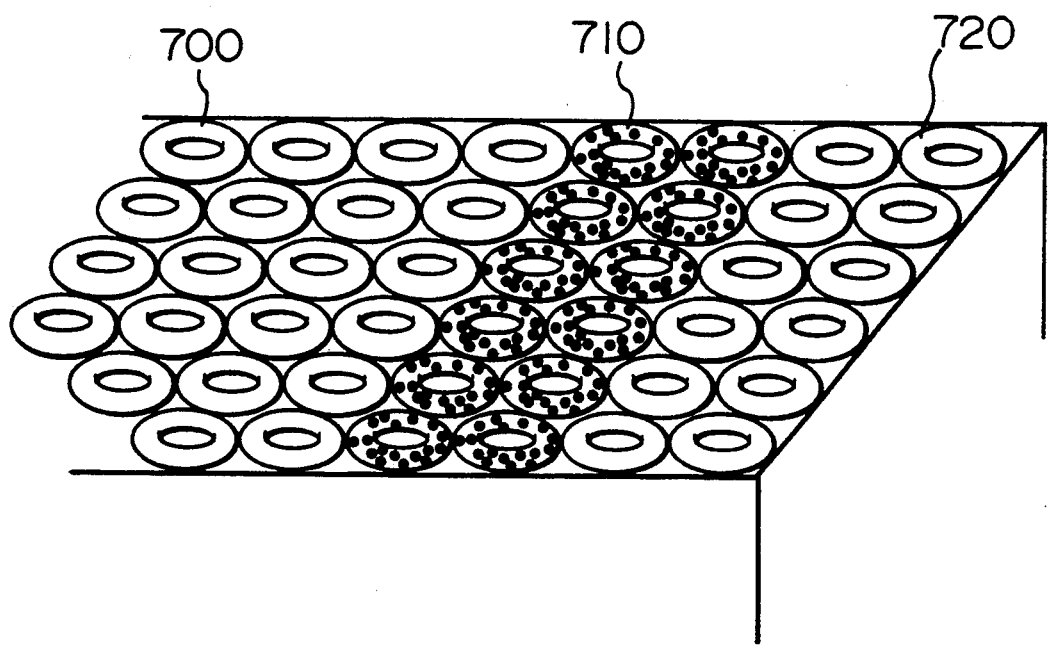
FIG. 7 is a diagram showing an impurity cluster of two-dimensional structures including toroidal molecules.

As shown in FIG. 7, the spatial change of characteristics can be brought by partially arranging impurity-adsorbed toroidal molecules 710 or one-dimensional structures thereof into a two-dimensional arrangement 720 constituted by a plurality of toroidal molecules 700. In this case, the arrangement can be used in a wide space, so that the characteristics of the system can be modulated by ion implantation.

Figure 8A:
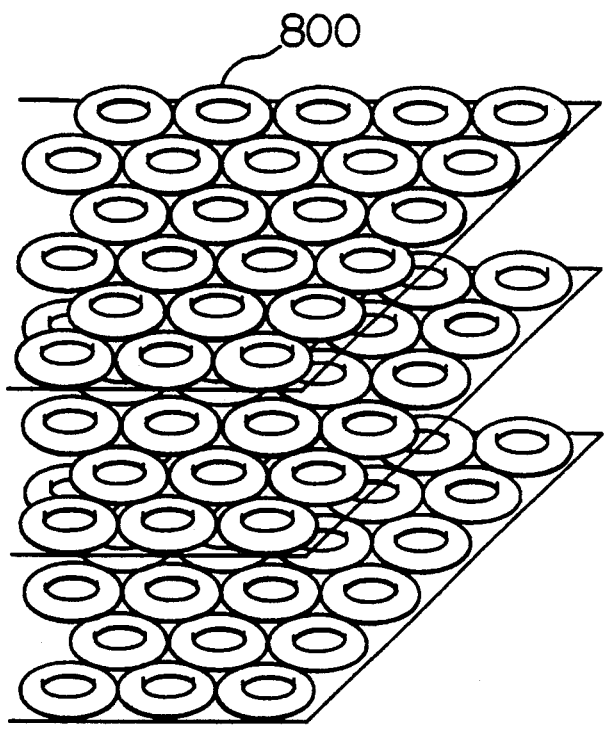
FIGS. 8(A) to 8(D) are diagrams showing three-dimensional structures including toroidal molecules.
Figure 8C:
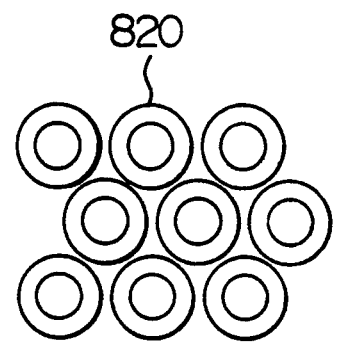
Figure 8B:
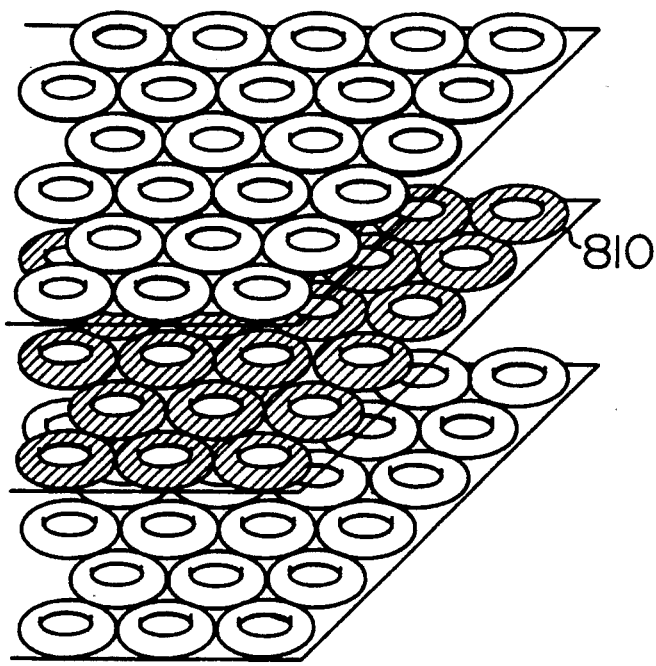
Figure 8D:
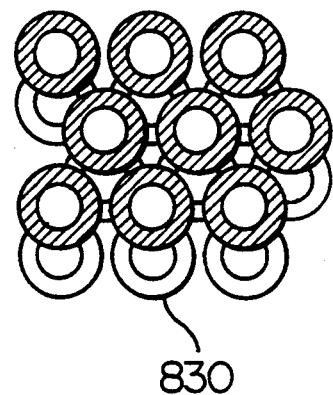

As a method of the three-dimensional arrangement of toroidal molecules, there is a crystallization method in which two-dimensional structures each constituted by a plurality of toroidal carbon molecules 800 are combined as a stratified formation as shown in FIG. 8(A). Further, the characteristics of the system can be modulated by impurity-adsorbed molecules or ion implantation. On the other hand, as shown in the arrangement 810 in FIG. 8(B), the characteristics of the system can be changed spatially by arranging impurity-adsorbed toroidal molecules or layers 810 thereof as a stratified formation. Further, the characteristics of the system can be modulated by arranging the positions of toroidal molecules of different layers so that they overlap each other as shown in the arrangement 820 in FIG. 8(C) or by arranging the positions of toroidal molecules of different layers at a predetermined distance so that they are not overlap each other as shown in the arrangement 830 in FIG. 8(D). Further, a three-dimensional arrangement structure in which two-dimensional planes having the arrangements 410 and 420 shown in FIG. 4 are laminated alternately exists stably. Also in this case, a considerably hard three-dimensional crystal can be provided by not weak inter-molecular force but strong inter-atom covalent bonding force.

Figure 9:
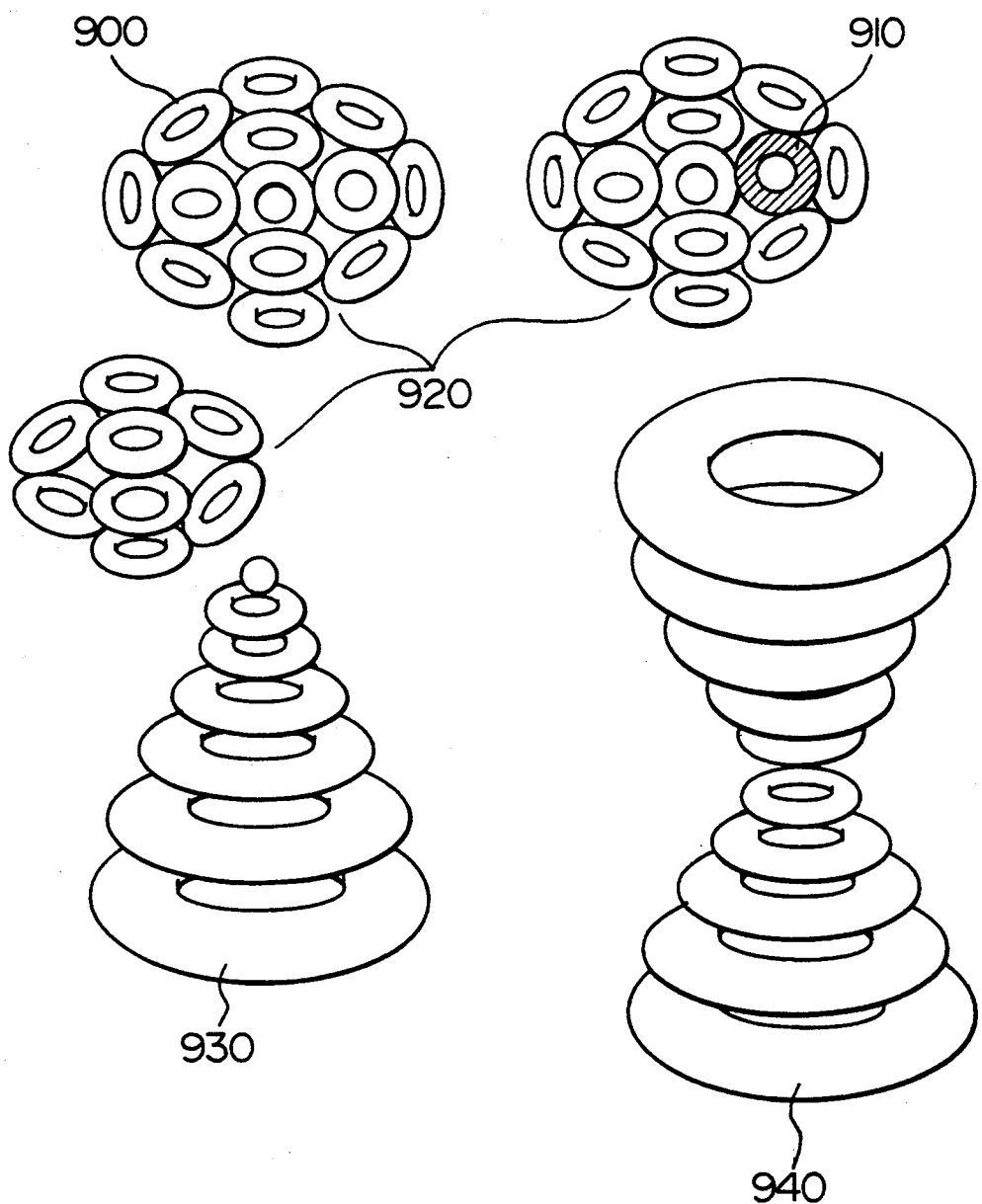
FIG. 9 is a diagram showing sets of three-dimensional toroidal molecules.

As shown in FIG. 9, a spheroidal giant carbon molecule (cluster) 920 may be formed by collecting many toroidal molecules 900. In this case, the characteristics of the cluster can be changed continuously by changing of mixing impurity-adsorbed toroidal molecules 910 into the cluster 920. Further, a thin film or a structure being low in the number of dimensions can be formed by combining a plurality of such molecules 920. The dynamic characteristics and the electric characteristics can be controlled in accordance with the method of combination thereof. As the piles 930 and 940 of toroidal molecules shown in FIG. 9, three-dimensional structures can be formed by piling up a plurality of toroidal molecules different in size. Also in the case of three-dimensional structures, a crystal or a giant molecule in which toroidal molecules are connected by not weak inter-molecular force but strong inter-atom covalent bonding force can be realized by arc discharge or laser radiation.

Figure 10:
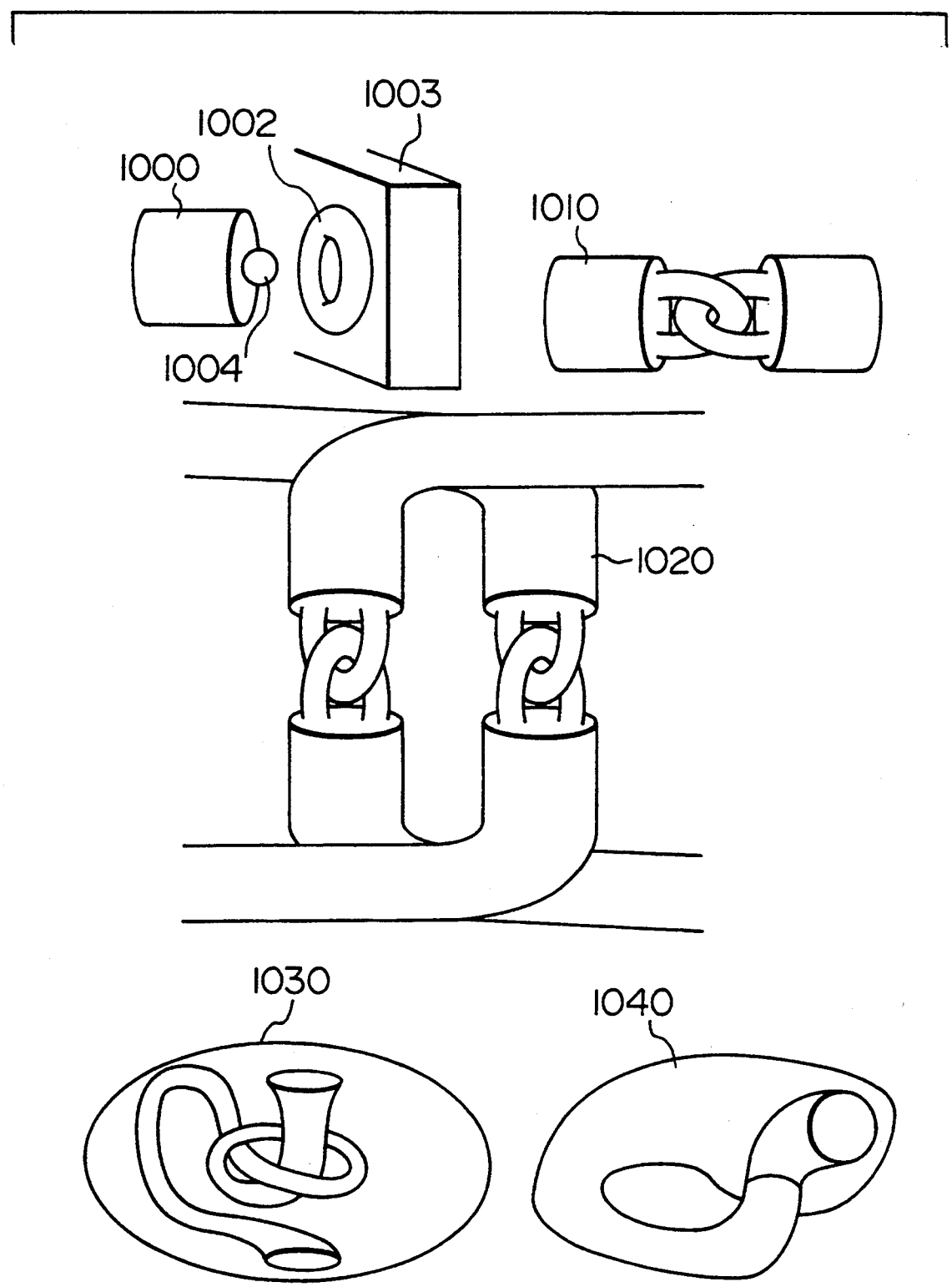
FIG. 10 is a diagram showing sets of clusters of three-dimensional toroidal molecules.

FIG. 10 shows an embodiment of a cluster of molecules formed by deforming toroidal molecules. Molecule structures 1000 and 1003 are molecules/crystals to form substrates. A spheroidal carbon molecule 1004 such as the sphere of buckminsterfullerene is adsorbed on the molecule structure 1000 to form a substrate, and a toroidal molecule 1002 having a hole to be just fitted to the sphere of buckminsterfullerene is adsorbed on the molecule structure 1003 to form the other substrate. As a result, the spheroidal molecule 1004 and the toroidal molecule 1002 are connected closely so that the substrates 1000 and 1003 constituted by molecules can be stuck and fixed to each other. Further, a key structure can be formed in a manner so that the toroidal molecule is halved and the separated molecules of the halved parts are fixed to molecules in directions opposite to each other to make a knot so-called Alexander's knot to thereby form a key structure as shown in the knot 1010 of toroidal molecules in FIG. 10. If a plurality of such key structures are used in combination as shown in the knot 1020 using toroidal molecules, a stronger key structure can be formed. As other molecular structures, a toroidal molecule 1030 having a knot formed at a hole and a molecule 1040 having a topological characteristic such as Klein's bottle being reversible can be formed.

Figure 11:
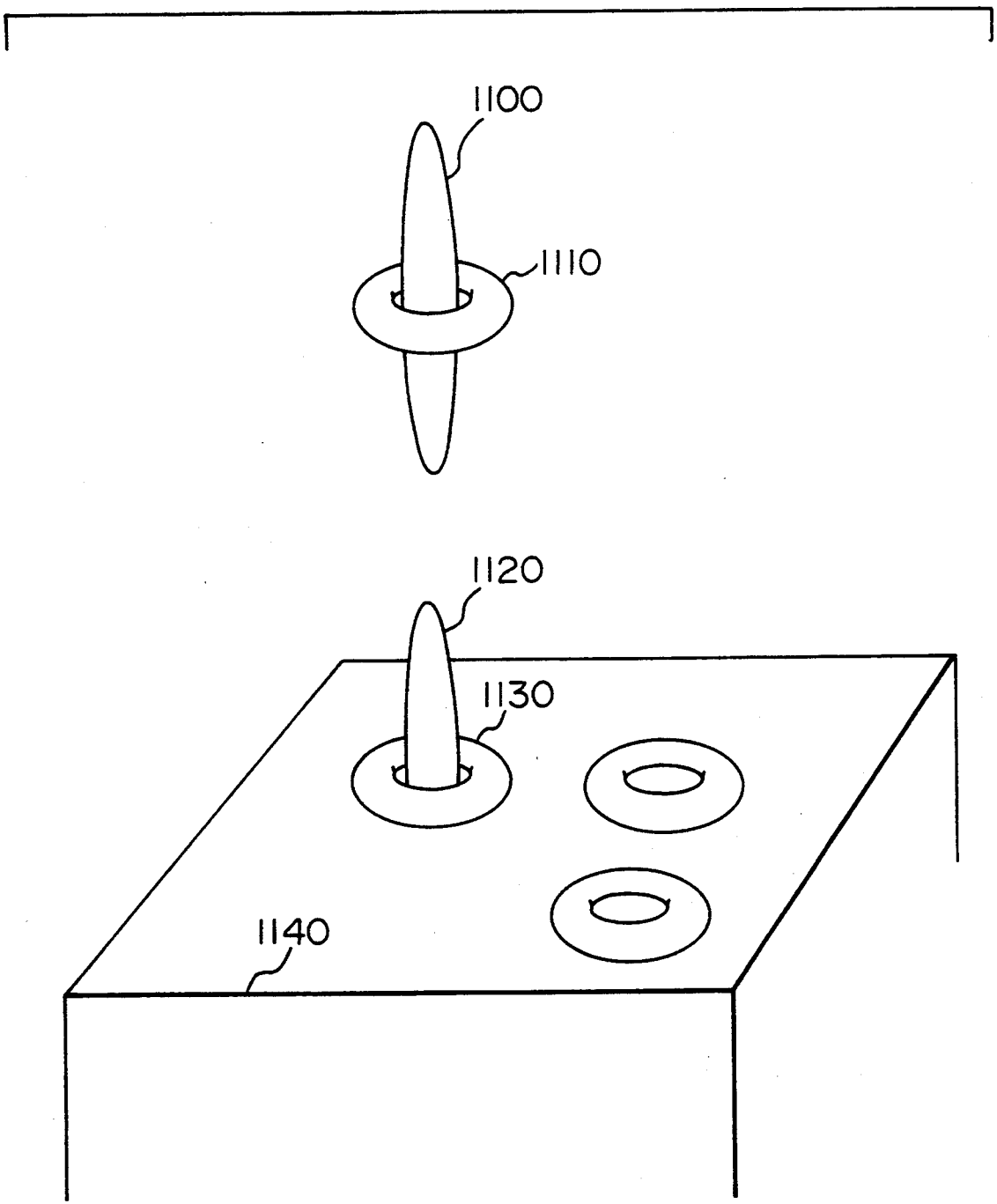
FIG. 11 is a diagram showing combinations of a toroidal molecule and a carbon tube or carbon capsule.

As shown in FIG. 11, a toroidal carbon molecule 1110 or a cluster 1130 of toroidal molecules on a substrate surface 1140 may be provided so that another atom/molecule can be adsorbed to the hole portion of the torus. In this case, a function such as an indicator for judging whether a rod-like molecule 1100 or 1120 is just fitted into the hole of the torus can be realized. This function can be used as an indicator. Because the change of the mechanical and electrical characteristics of the whole molecule 1110 or 1130 is caused by the shape change of the upper and lower portions of the rod molecule 1100 and 1120 inserted into the toroidal carbon molecules 1110 and 1130, the structure of FIG. 11 can serve as a pressure sensor by making the pressure change correspond to the shape change and further making the shape change correspond to the change of current-voltage characteristic.

As shown in FIG. 12, a toroidal molecule 1210 can serve as a molecule-size capsule when the toroidal molecule 1210 or a cluster of toroidal molecules is provided so that an impurity molecule 1200 including atoms other than carbon can be adsorbed in the cylindrical ring of the molecule or the cluster 1210. That is, the cylinder of the toroidal molecule is opened locally by laser radiation, so that specific atoms/molecules are embedded in the inside of the toroidal molecule by an STM or the like. Thereafter, the toroidal molecule is moved to a certain place and the cylinder of the toroidal molecule is opened locally again by laser 1 radiation or the like, so that specific atoms/molecules are taken out. Further, in the case where a specific size toroidal molecule or a cluster of toroidal molecules can adsorb other atoms/- molecules by directly taking the other atoms/molecules from the surface of the cylinder thereof into the inside thereof, the toroidal molecule 1210 can serve as a deodorizer.

As shown in FIG. 13, a slender rod-like molecule 1320 such as a nanometer-scaled tube, i.e., a carbon nano-tube may be passed through holes of specific size toroidal molecules (or clusters) 1300 and 1310 to make it possible to provide a function of a rotor/wheel of a novel very fine molecular machine. When, for example, one molecule 1300 is rotated by a method as shown in FIG. 14, the rotation can be transmitted to the other toroidal molecule 1310 through the carbon nano-tube 1320 by inter-molecular force between each of the toroidal molecules 1300 and 1310 and the carbon molecule 1320. If the carbon nano-tube 1320 is replaced by a curved tube having arbitrary torsion, the motive power can be transmitted further in the direction of the axis of the carbon tube.

As shown in FIG. 14, another slender axial molecule 1410, i.e., a very slender molecule such as a carbon nano-tube may be passed through a specific size toroidal molecule (or cluster) 1420 to make it possible to provide a rotor of a very fine molecular machine. The operating mechanism of the rotor of the very fine molecular machine will be described below in detail. When, for example, an electrostatic field is applied to the toroidal molecule 1420 clockwise by using eight electrodes 1430 shown in FIG. 14, the carbon molecule 1420 is polarized and rotates to follow the change in polarity of the electrodes. To raise the rotation efficiency, it is necessary to optimize the number of electrodes 1430 and the timing of the electric field change and to supply impurities to facilitate the polarization of the carbon molecule 1420. This can be achieved easily. For example, the rotation efficiency can be improved by changing the number of carbon atoms, that is, by changing the structure of the toroidal molecule so that fivefold rings 1400 contained in the toroidal molecule project from the outer wall surface of the toroidal molecule. Because the present invention uses a stable molecular structure, the structure can be determined substantially uniquely when the external condition with respect to the number of molecules is kept constant. Accordingly, the size of the structure can be made uniform in a very fine size range.

Figure 15:
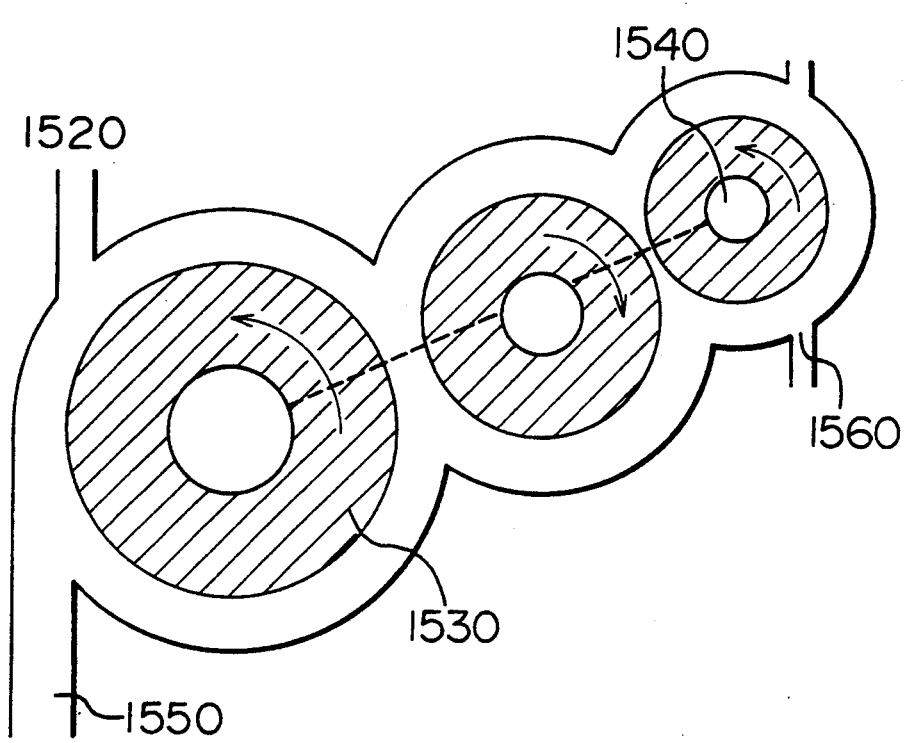
FIG. 15 is a diagram showing gears each constituted by a toroidal molecule.

When toroidal molecules different in size are produced by changing the number of atoms and are rotated in arrangement as shown in FIG. 15, gears of a very fine molecular machine can be provided. In FIG. 15, the shape of a portion of the toroidal molecule 1530 corresponding to teeth of a gear can be changed by changing the number of carbon atoms constituting the toroidal molecule 1530. Portions 1550 and 1560 each constituted by the one-dimensional arrangement 1520 of toroidal molecules are paths of propagation of light atom lean gas or light. In either case, particles of light atom lean gas or light collide with a gear in the incident side to transfer the momentum of the particles to the gear, so that the gear rotates. Alternately, one toroidal molecule receives rotation force directly from the carbon tube 1540 as an axis and rotates another adjacent toroidal molecule through teeth of the gear, so that rotational speed can be changed by using a difference in size between toroidal molecules.

Figure 16A:
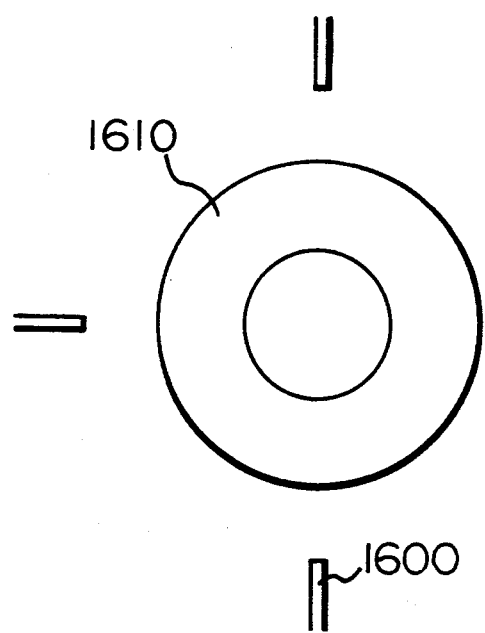
FIGS. 16(A) and 16(B) are diagrams showing a quantum (effect) device of a toroidal molecule and relation of resistance and strength of magnetic field.
Figure 16B:
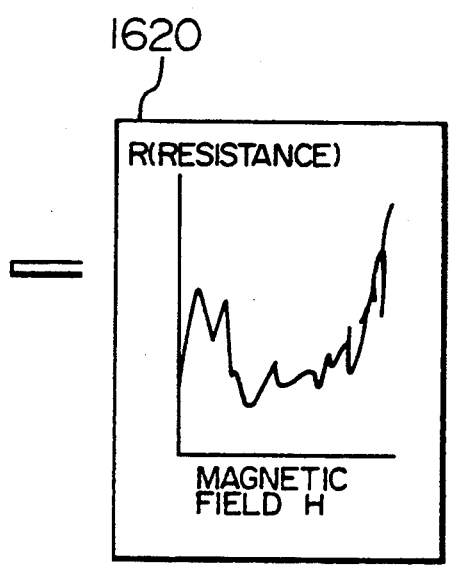

When specific size toroidal molecules (or clusters) are used in combination so that the energy band structure for electrons/holes is changed in accordance with the number of carbon atoms contained in each molecule (or cluster) to respond to light of a specific wavelength, an optical device for optically exciting/absorbing electrons can be formed. As shown in FIG. 16(A), the electron distribution in a toroidal molecule (or cluster) 1610 can be changed when the magnetic/electric field is changed in the vicinity of the hole of the torus by controlling the magnetic/electric field generated by lead wires, electrodes, or STM probes 1600 disposed in the vicinity of the toroidal molecule 1610. Thus, the toroidal carbon molecule 1610 can be made to serve as an electronic device. Particularly, when the magnetic field is supplied to pass through the hole of the torus, the toroidal molecule functions as an Aharonov-Bohm effect device. As a result, a quantum effect relation is obtained between resistance R and magnetic field intensity H as shown in the graph 1620 of FIG. 16(B).

Figure 17:
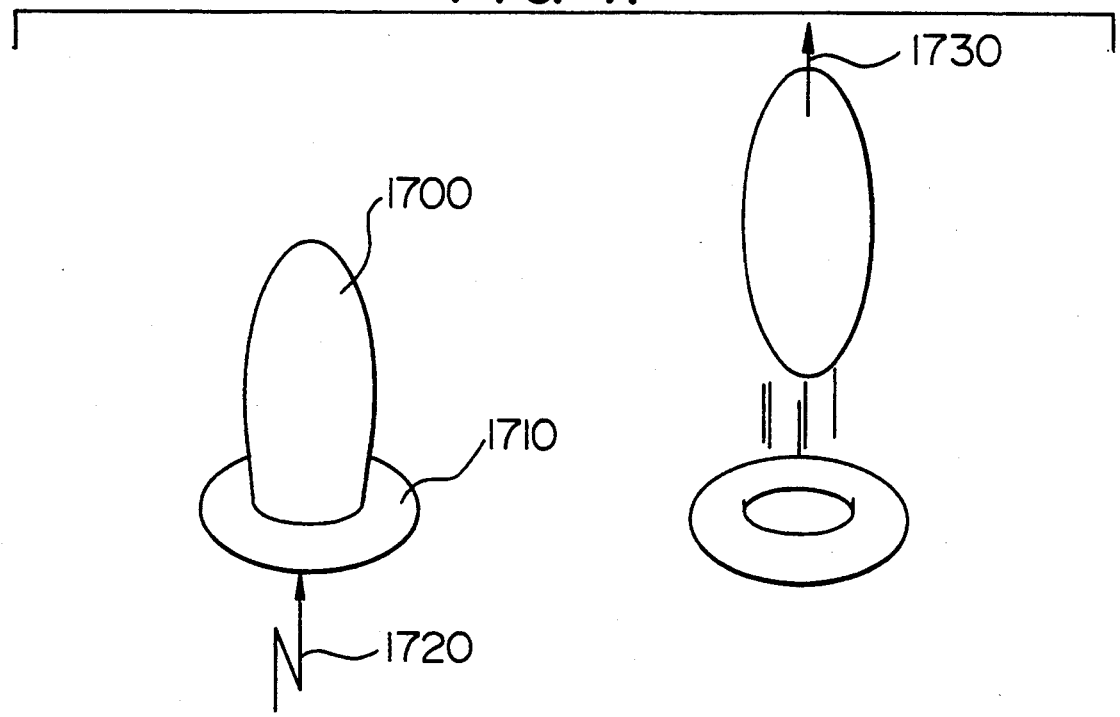
FIG. 17 is a diagram showing a molecular-rocket launcher of a toroidal molecule.

As shown in FIG. 17, the hole of a specific size toroidal molecule (or cluster) 1710 is blocked by another tubular or spheroidal molecule 1700. When a chemical/nuclear reaction is then brought by applying a neutron beam/gamma ray 1720 to the portion of the hole, the molecule 1700 which has blocked the hole is sprung out of the toroidal molecule 1710 at a predetermined speed 1730. Thus, such mechanism can be used as a launcher for giving kinetic energy to a molecule.

Figure 18:
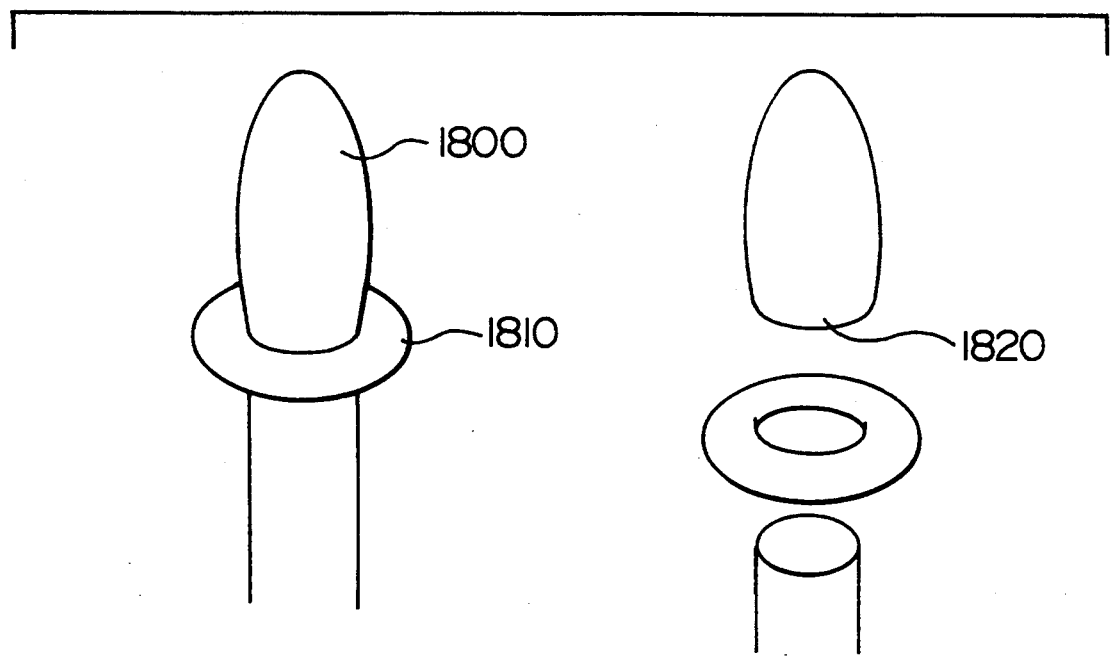
FIG. 18 is a diagram showing a molecular chopper of a cluster of toroidal molecules.

As shown in FIG. 18, when a hole of a certain-size toroidal carbon molecule 1810 is narrowed rapidly by quenching the toroidal carbon molecule 1810 after a big tubular or spheroidal carbon molecule 1800 is inserted into the hole widened by heating the toroidal carbon molecule 1810, a function for chopping or crushing the molecule 1800 can be provided. As another chopping method, another molecule is inserted into the respective holes of two toroidal molecules arranged closely in parallel to each other, and then the two toroidal molecules are pulled in opposite directions by an STM or by the above-mentioned sticking method to make it possible to chop or crush (1820) the other molecule.

Further, when a plurality of impurity toroidal 1 molecules in which impurities are enclosed are used in combination, a gyroscope can be provided. In this case, a carbon tube capable of passing through the hole of the toroidal molecule is used as the shaft of the gyroscope.

Further, when the theory of a rotor shown in FIG. 14 is applied to the combination of a toroidal molecule and a carbon tube, a micro molecular top can be constructed.

Figure 19:
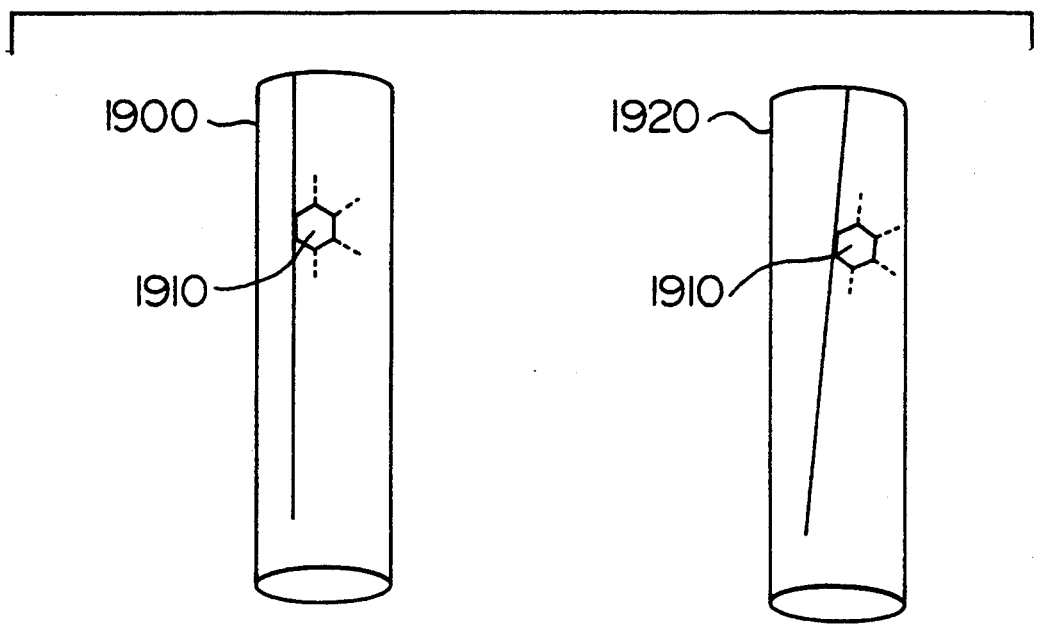
FIG. 19 is a diagram showing cylindrical carbon molecules.

As shown in FIG. 19, a cylindrical carbon molecule 1900 constituting a torus can be provided by arranging sixfold rings 1910 of carbon atoms along an axis parallel to the center line of the cylinder, whereas a cylindrical carbon molecule 1920 having torsion can be provided by arranging such sixfold rings 1910 along an axis inclined with respect to the center line of the cylinder.

Although the above description has been made upon the assumption that a toroidal molecule or a cluster of toroidal molecules is used, a helically-coiled carbon molecule can be formed by suitably changing the pressure, temperature, electric field, light, radiation, magnetic field or arc discharge current/voltage. In this case, a plurality of carbon atoms are so arranged that sevenfold rings each constituted by a plurality of carbon atoms are arranged in the inside of the helical coil while fivefold rings are arranged in the outside of the helical coil. Further, with respect to other carbon rings than the sevenfold and fivefold rings, when the arrangement of carbon atoms is distorted slightly after the carbon atoms are arranged so that the bonding length between atoms and the angle between atoms approach the bonding length of the graphitic structure of carbon and the angle (120 degrees) between atoms therein, a helically-coiled carbon molecule or a multiple helically-coiled carbon molecule (inclusive of a double helically-coiled carbon molecule) can be formed. In this case, a combination of an eightfold ring and some fivefold rings or a combination of a sevenfold ring and some sixfold rings may be arranged in the vicinity of the innermost wall surface of the helically-coiled carbon molecule.

Figure 20:
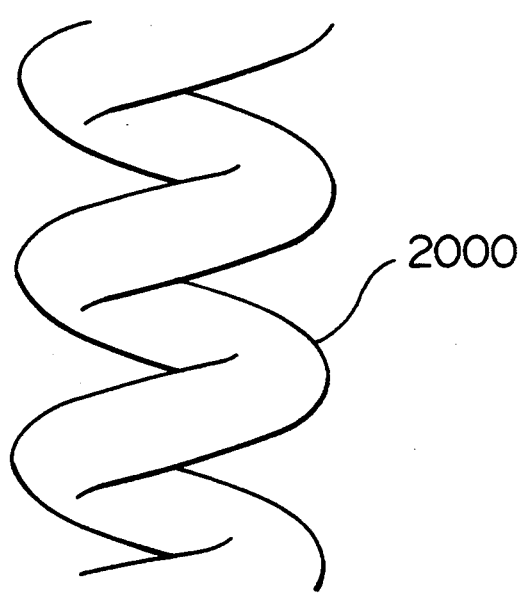
FIG. 20 is a diagram showing a helically-coiled carbon molecule.

When the stability against temperature, of a helically-coiled molecular structure 2000 shown in FIG. 20 is examined by simulation upon the assumption of potential of atoms on the basis of molecular dynamics, the helically-coiled carbon molecular structure exists stably even at 2000K. Furthermore, cohesive energy at a very low temperature is about $-7.3$ eV per one atom, so that this molecular structure exists stably. Such helically-coiled structure can be provided by the steps of: chopping a toroidal molecule by using an STM or the like; moving up and down the chopped portions with respect to a plane of the toroidal molecule; and joining the toroidal molecule to another toroidal molecule processed in the same manner as described above. By using the thus produced helically-coiled molecular structure, a spring of a molecular machine can be formed.

Figure 32:
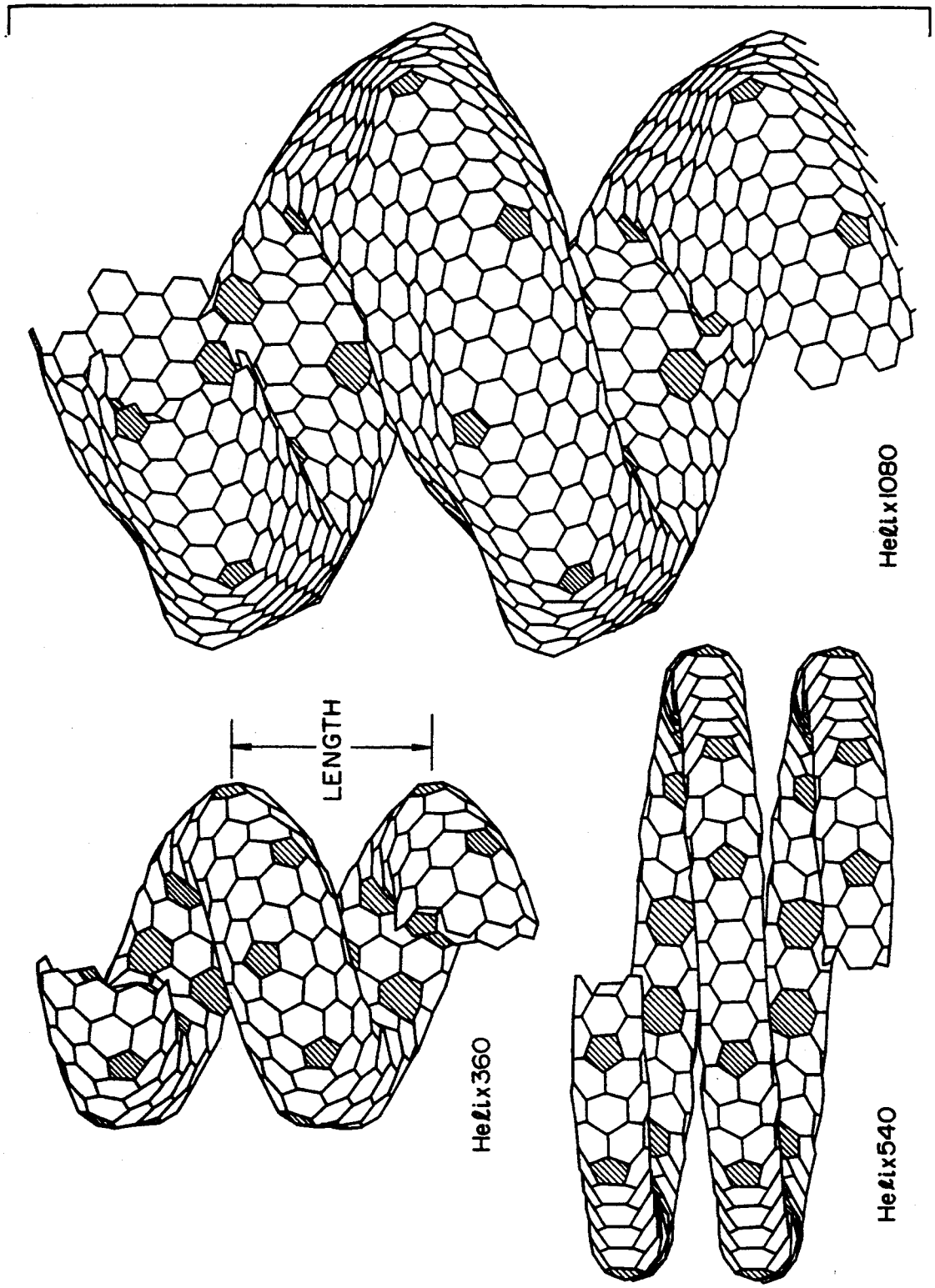
FIG. 32 is a diagram showing helically-coiled molecular structures.

FIG. 32 shows various kinds of helically-coiled molecular structures different in the one-cycle axial length of the helical coil corresponding to the pitch of a spring. The helically-coiled molecular structures are expressed as Helix$_N$ in accordance with the number N of carbon atoms contained in one cyclic pitch of the molecular structure. As described above, Helix$_N$ can be obtained by the steps of: chopping a toroidal molecule C$_N$; slightly deforming the chopped portions as in the above description; and connecting the chopped portions. FIG. 32 shows Helix$_{360}$, Helix$_{540}$ and Helix$_{1080}$ corresponding to C$_{360}$, C$_{540}$ and C$_{1080}$ respectively.

Figure 33:
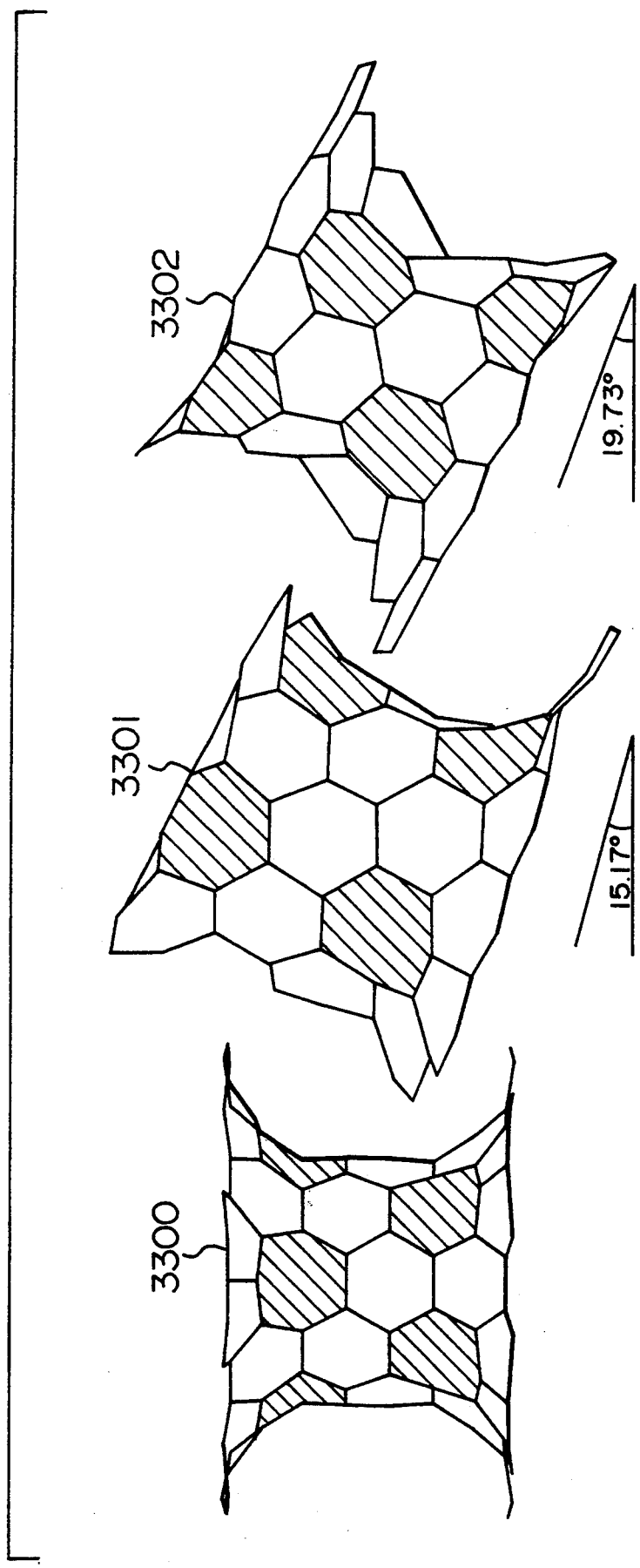
FIG. 33 is a diagram showing the change of the internal pattern of Helix$_{360}$ with respect to the length thereof.

Even in the case where the number of carbon atoms is kept constant, the length of the helically-coiled molecular structure can be changed if the shape or arrangement of sevenfold rings contained in the inner wall surface of the helically-coiled molecular structure, i.e., an internal pattern is changed. FIG. 33 shows the change of the internal pattern with respect to the length of Helix$_{360}$ shown in FIG. 32. In FIG. 33, the pattern 3300 is an internal pattern of a toroidal molecule in the case where the length of the helical coil is 0. In FIG. 33, the patterns 3301 and 3302 are internal patterns of Helix$_{360}$ different in the length of the helical coil. The length of the helical coil in the pattern 3302 is larger than that in the pattern 3302. An angle of inclination of the cylinder portion of the helically-coiled molecular structure with respect to a plane perpendicular to the center axis of the helical coil is shown in the lower of each of the patterns 3301 and 3302 in FIG. 33. The original C$_{360}$ is deformed by the angle, so that Helix$_{360}$ is obtained.

FIG. 34 shows helically-coiled molecular structures different in the pattern of the inner wall surface of Helix$_{360}$ as shown in the pattern 3301 in FIG. 33. The pattern 3402 in FIG. 34 is the same as the pattern 3301 in FIG. 33. In the patterns 3400 and 3401 in FIG. 34, the inner wall surface is formed by using fivefold rings as well as sevenfold rings. In the pattern 3401 in FIG. 34, fivefold rings shown in the pattern 3400 in FIG. 34 are deformed considerably.

Figure 21:
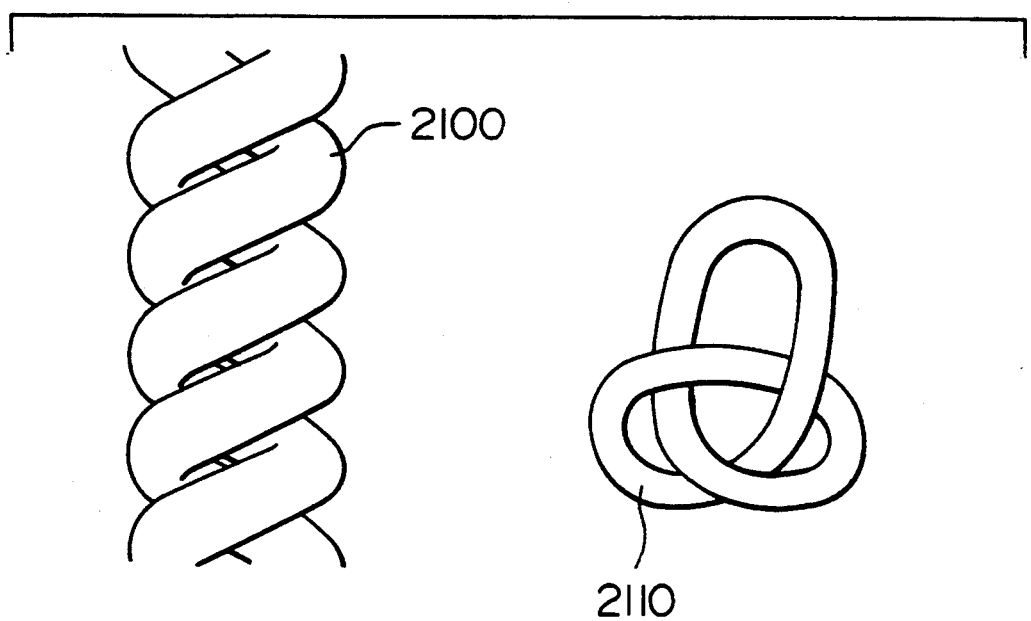
FIG. 21 is a diagram showing multiple helically-coiled carbon molecules.
Figure 22:
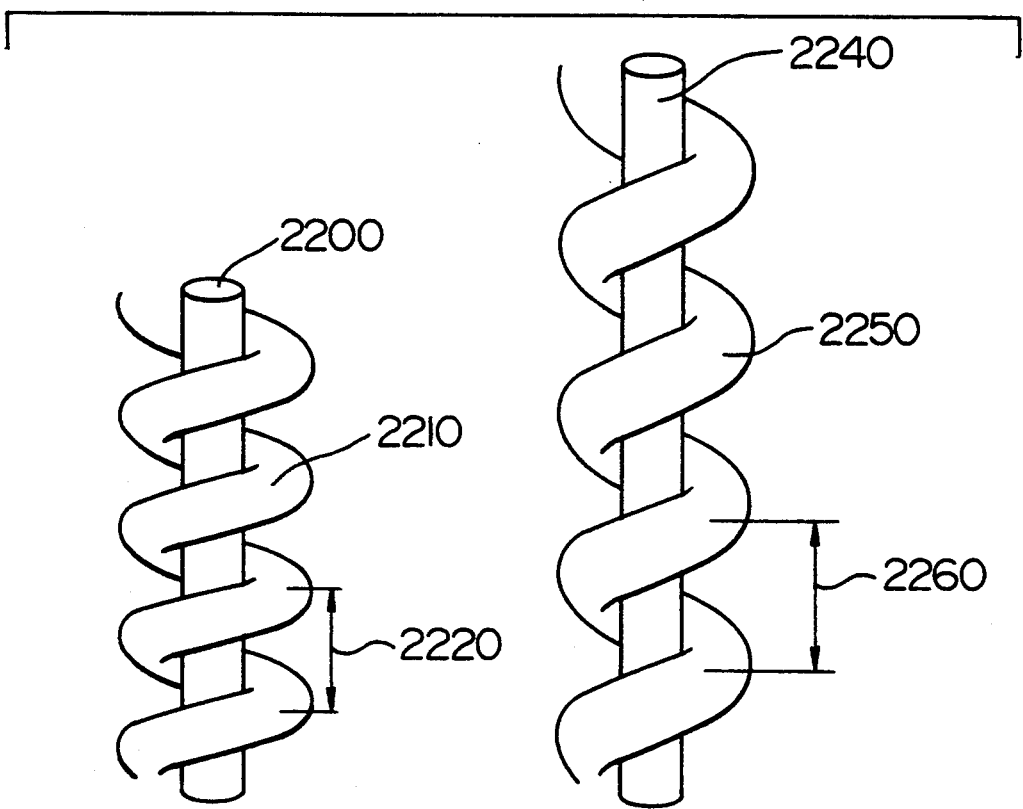
FIG. 22 is a diagram showing clusters each constituted by a cylindrical carbon molecule and a helically-coiled molecule.

FIG. 21 shows a double helically-coiled carbon molecule 2100. Similarly, a multiple helically-coiled structure can be formed. A knotted helically-coiled carbon molecule 2110 shown in FIG. 21 is also stable. In these molecular structures, diversity can be given to the characteristic of the multiple helical coil in accordance with the number of windings to be intertwined, the interval of torsion or the difference in defects/impurities contained in the inside. In the cylindrical carbon molecules shown in FIG. 19, the molecule 1900 in which sixfold rings are parallel to the axis of the cylinder and the molecule 1920 in which sixfold rings are inclined with respect to the axis of the cylinder are different from each other in the physical properties of the cylindrical carbon molecules. As shown in FIG. 22, when cylindrical molecules 2200 and 2240 are wound with helically-coiled molecules 2210 and 2250 respectively, the physical properties can be changed in accordance with the winding pitches 2220 and 2260. In this case, the structure of the helically-coiled molecule 2210 with respect to the cylindrical molecule 2200 can be controlled in accordance with the interval of torsion or the difference in defects or impurities contained in the inside.

Figure 23:
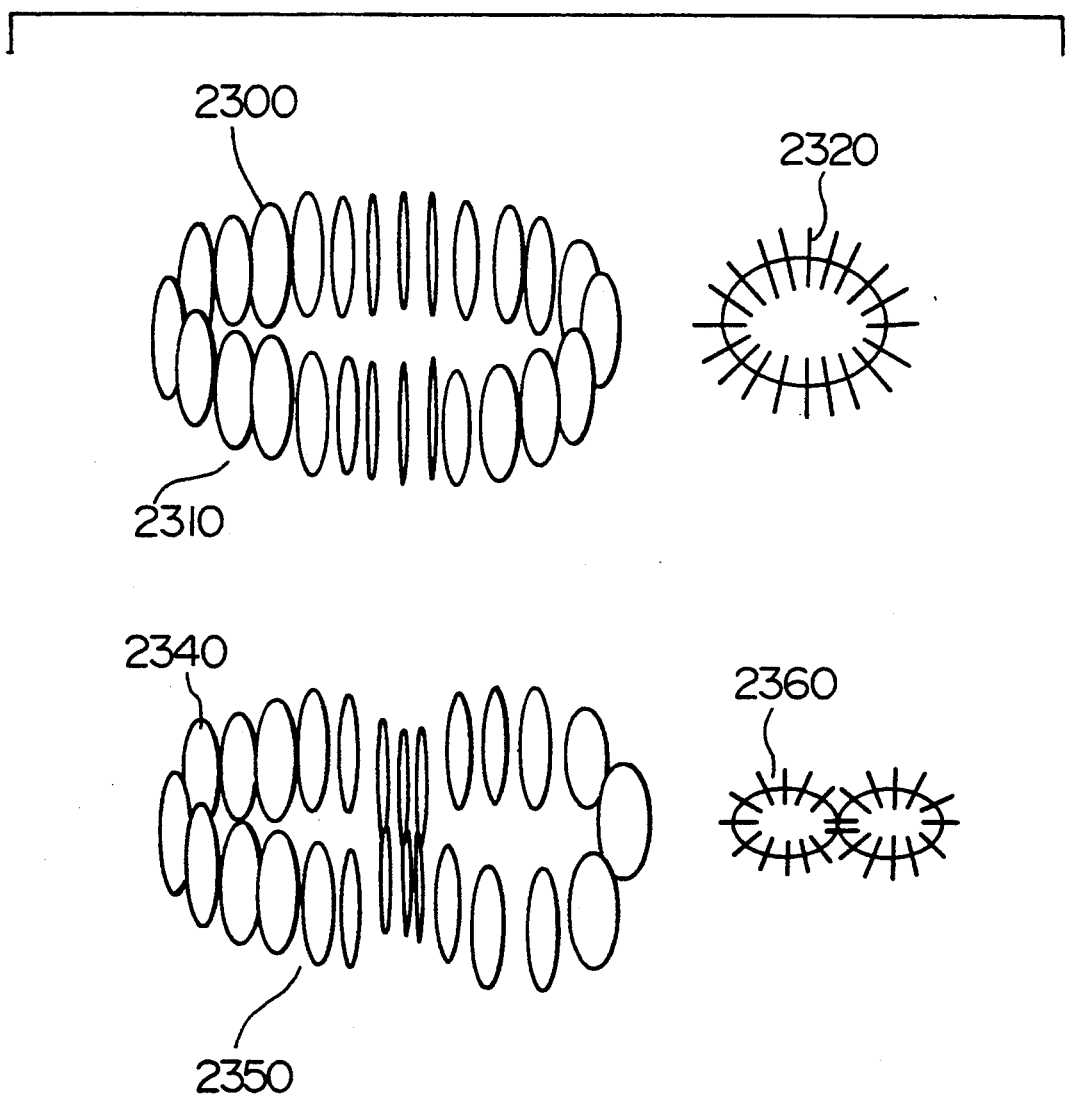
FIG. 23 is a diagram showing giant torus molecules.

As shown in FIG. 23, the above-mentioned toroidal structure or helically-coiled structure can be constituted of small toroidal carbon molecules 2300. The state 2320 in which the thus constituted giant single ring structure 2310 is observed from above can be made to correspond to bit "0", while the stable state 2360 in which two rings facing to each other are formed so as to be dense when the giant double ring structure 2350 constituted by cylindrical carbon molecules 2340 shown in FIG. 23 is observed from above can be made to correspond to bit "1". Such control can be achieved easily when an electric field locally large in intensity is applied to the giant molecule by using an STM or the like.

Figure 24:
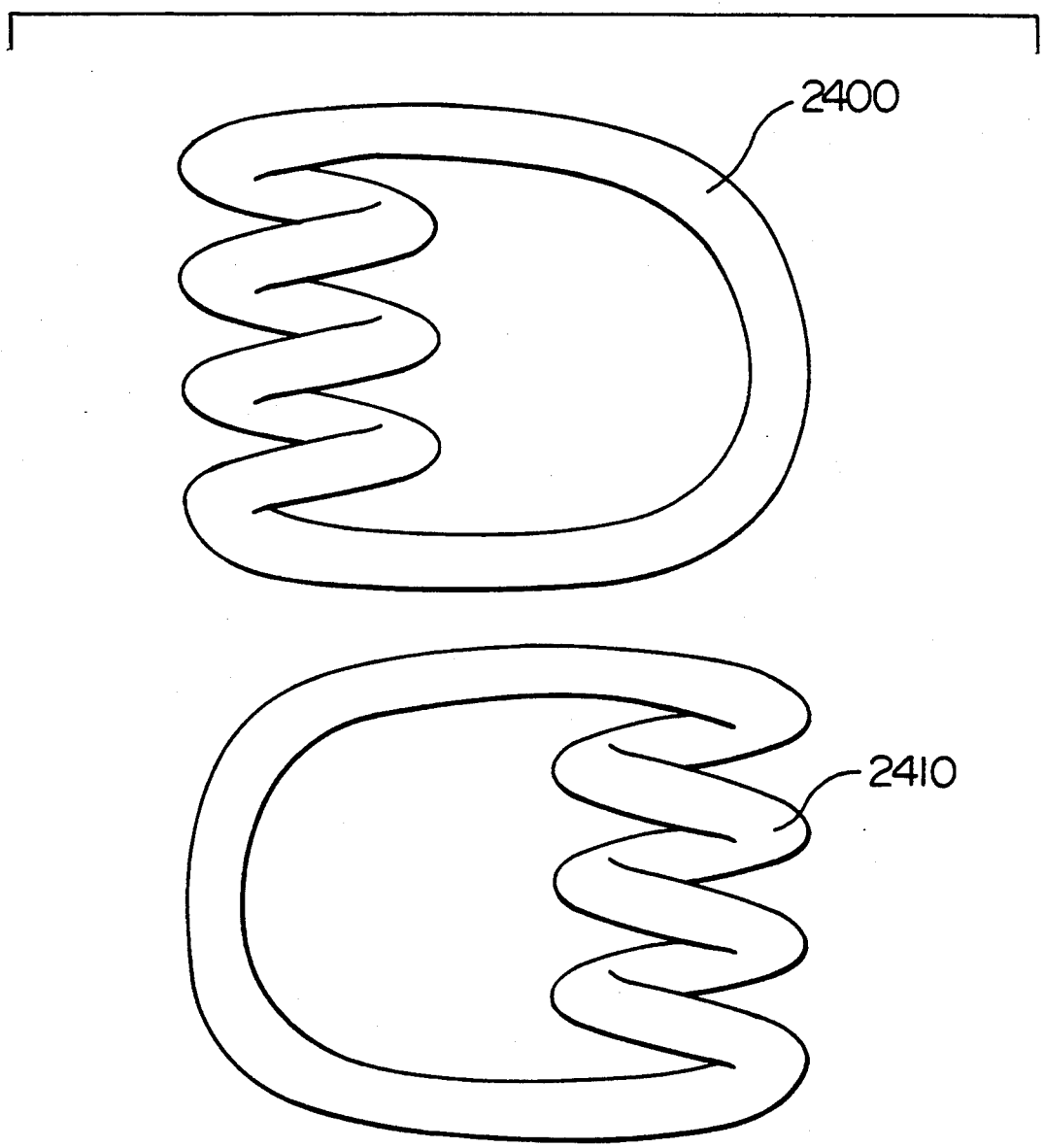
FIG. 24 is a diagram showing positively and negatively coiled super helical structures.
Figure 26:
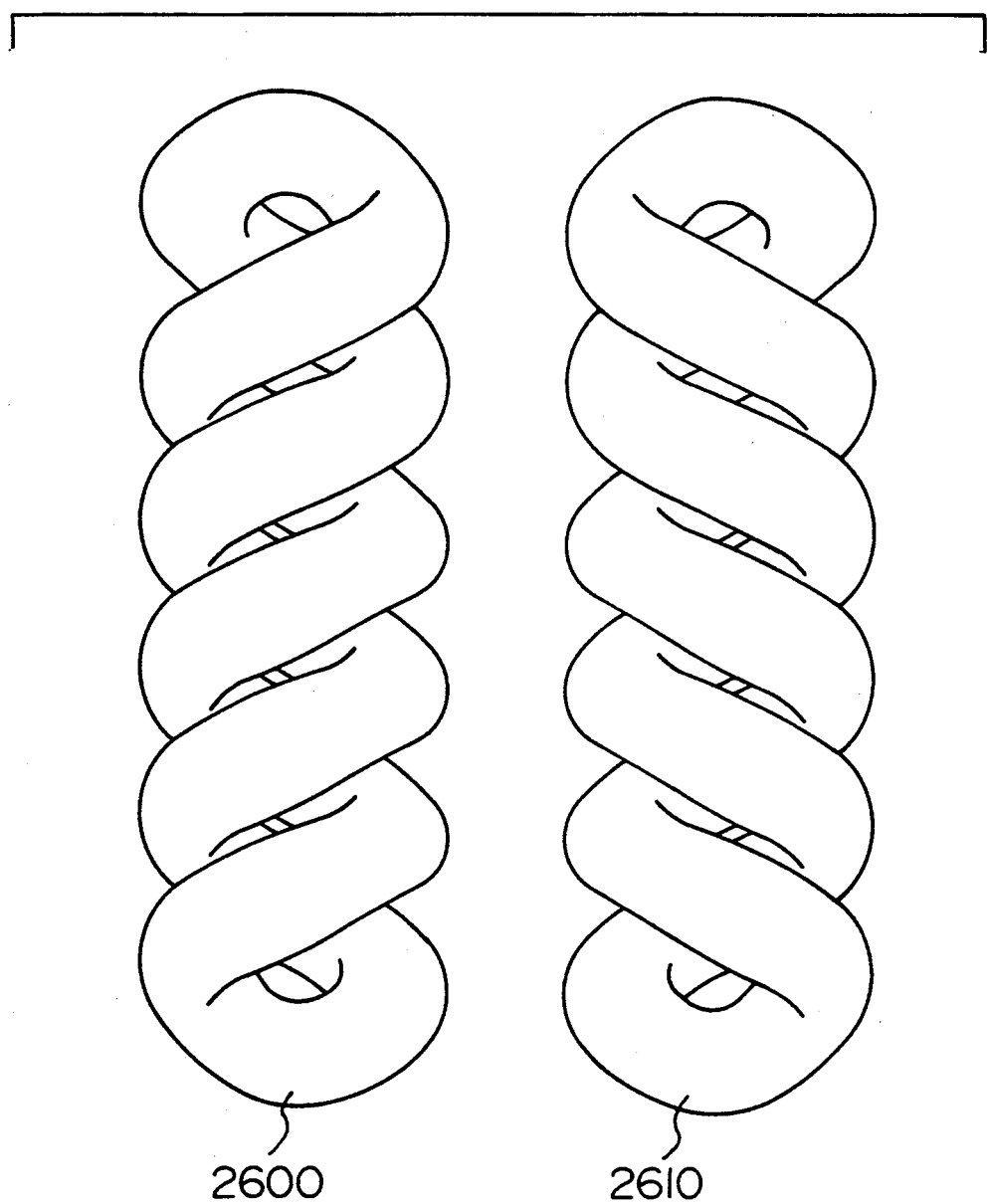
FIG. 26 is a diagram showing positively and negatively coiled super helical structures.

FIGS. 24, 25, 26 and 27 show super helical structures each containing a helical structure. FIG. 24 shows negatively and positively coiled super helical structures 2400 and 2410 in which opposite ends of a negatively or positively coiled helical coils are connected to each other through a part of a toroidal molecule, respectively. FIG. 25 shows negatively and positively coiled super helical carbon molecules 2500 and 2510 in which one part of a double helical coil obtained by winding two negatively or positively coiled helical coils on each other and connecting respective opposite ends thereof to each other is connected to another double helical coil obtained in the same manner as described above, respectively. FIG. 26 shows negatively and positively coiled super helical carbon molecules 2600 and 2601, in which respective opposite ends of two negative and positive helical coils are connected to each other after the helical coils are wound on each other, respectively. FIG. 27 shows negatively and positively coiled super helical carbon molecules 2700 and 2710, in which respective opposite ends of two negatively and positively coiled helical coils are connected to each other through deformed negatively or positively coiled helical coils, respectively. The helical structure in which the center axis is shaped like a straight line changes to any one of the positively and negatively coiled super helical structures 2400 to 2710 in accordance with environment such as the temperature, pressure, etc. and the presence/absence of molecule in the periphery. By using this property, a multivalue memory element can be formed. When a subsidiary normal vector perpendicular both to a tangent vector of the helical coil and to a main normal vector expressing the rate of the change of the tangent vector is determined, the helical coil in the case where the inner product of the subsidiary normal vector and a vector expressing the direction of the center axis of the helical coil is positive is defined as a positively coiled helical coil (counterclockwise) whereas the helical coil in the case where the inner product is negative is defined as a negatively coiled helical coil (clockwise). Further, information can be read/written by using a plurality of helically-coiled molecules to give torsion to one helical coil on the basis of another helical coil or to read the presence/absence of torsion of one helical coil on the basis of another helical coil. These helically-coiled molecules (or clusters) can be used for the purposes described above in the case of tori.

Figures 28, 29:
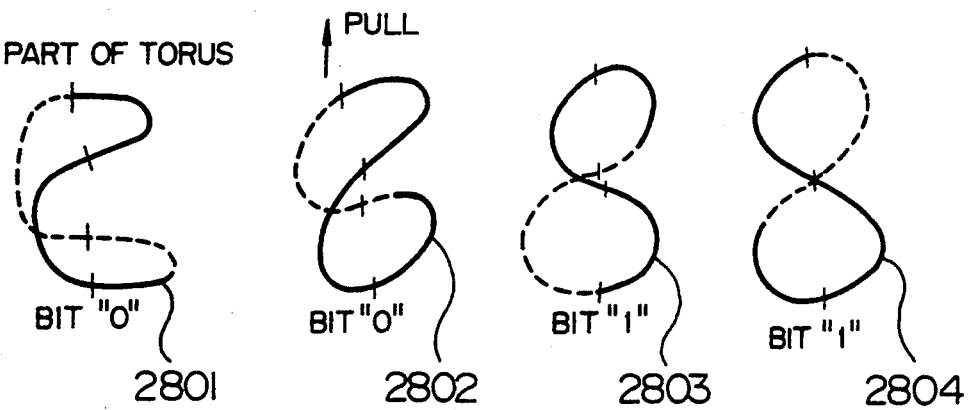
FIG. 28 is a diagram showing solid structures in which carbon tori are connected partially.
FIG. 29 is a diagram showing structures in which other tori are inserted into the structures of FIG. 28 respectively.
Figure 30:
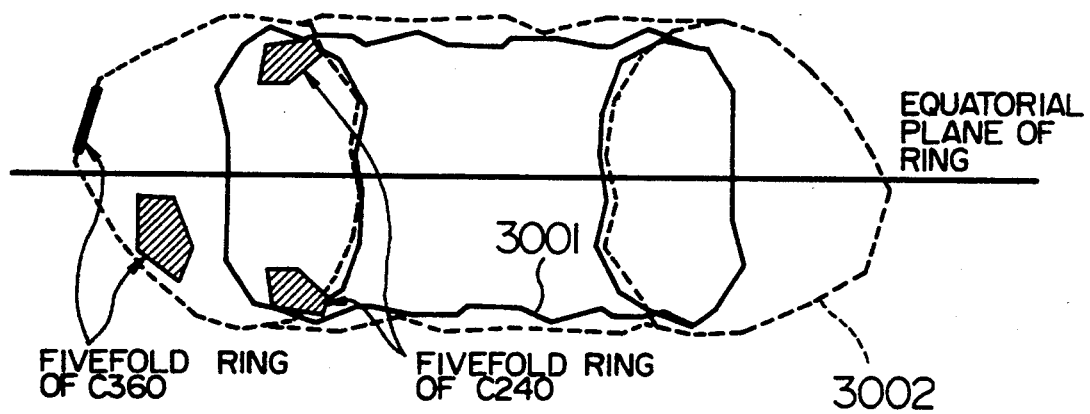
FIG. 30 is a section of two tori different in structure.

Alternatively, as shown in FIGS. 28 and 29, solid structures may be formed by connecting half circles each constituting a part of a torus so that the structural change in accordance with the method of giving torsion can be made to correspond to one bit. In FIG. 28, solid structures 2801 and 2802 which are observed as a U-shape transversely are made to correspond to bit "0" while solid structures 2803 and 2804 which are observed as an 8-shape are made to correspond to bit "1". In FIG. 28, a bit train "0011" is expressed by four solid structures. In FIG. 29, another ring (torus) 2901 is passed through such a U-form solid structure 2900 as shown in FIG. 28 so that the state in which the torus is observed as a 1-shape transversely is made to correspond to bit "1" while the state in which the torus is observed as a "—"-shape or a 0-shape is made to correspond to bit "0". As shown in the broken line of FIG. 29, a further torus 2902 may be provided additionally so that a code correction or additional bit can be expressed. The movement of the torus or the change of the shape as shown in FIGS. 28 and 29 can be achieved by mechanical or electric force provided from the outside. A sensor can be formed by using the change of the positions of fivefold and sevenfold rings in accordance with the mechanical change of the above-mentioned structure such as the toroidal structure per se or the helical structure. That is, a sensor can be provided by observing the change of the shape directly with an STM or the like or by picking up the change of the shape as the voltage/current change through an STM. Further, if the positions of fivefold and sevenfold rings constituting the surface of the torus are changed preliminarily, the sectional shape of the torus can be changed as shown in FIG. 30 so that tori different in characteristic and structures such as helically-coiled structures can be obtained. For example, a structure such as a device, a sensor, etc. having a parameter range different from that of the above-mentioned structures can be provided by enclosing another atom in the center hole of the torus or in the tube of the torus or by connecting some structured materials thereto. FIG. 30 is a section of $C_{240}$ and $C_{360}$ seen from a plane passing the center axis of a torus. The section 3001 of $C_{240}$ shown in the solid line and the section 3002 of $C_{360}$ shown in the broken line are different from each other in the positions of fivefold rings.

By adding atoms such as nitrogen atoms, boron atoms, etc. to the above-mentioned toroidal molecules, clusters thereof or helically-coiled molecules, by distorting or twisting rings by using a local temperature, stress, electrolysis, etc. or by generating defects through insertion/removal of carbon atoms, there are formed toroidal molecules, helically-coiled structures or clusters thereof different in the method of connection of rings. These are applied to the purposes described above in the case of tori constituted singly by carbon atoms. Further, by supplying an electric current to a molecular structure constituting a cylindrical surface after adding impurities to the molecular structure, a helically-coiled molecule can be used as a solenoid. Further, by gradually reducing the diameter of the cylindrical surface of the helically-coiled molecule, a molecular spring is formed. Furthermore, a telescopic structure of toroidal molecules can be formed by constructing a small toroidal molecule in the above-mentioned toroidal molecule.

Finally, the method for constructing a toroidal molecule or a helically-coiled molecule will be described below. In a low-temperature state, a fivefold ring of a spheroidal carbon molecule is caught by a probe of an STM and pressed down to another fivefold ring in the symmetrical position with respect to the center of the sphere to form a toroidal molecule. Alternatively, the toroidal molecule can be realized by arranging carbon atoms one by one while supplying an electric/magnetic field. A structure in which these molecules contain impurities can be formed by pressing a spheroidal carbon molecule containing impurities by a probe of an STM. Alternatively, a structure in which these molecules contain impurities can be also achieved by arranging new molecules/atoms one by one on a toroidal molecule or helically-coiled molecule of pure carbon by using an STM.

For constructing a toroidal molecule, a toroidal molecule is formed such that a plurality of sixfold rings each including six atoms are arranged in a torus form, while changing external physical force to be applied to the atoms. Then, the atoms arrangement in said toroidal molecule is changed such that first ones of the sixfold rings arranged on an outer wall surface of the toroidal molecule are replaced by first fivefold rings each including five atoms. The first sixfold rings are apart from each other. Also, the atoms arrangement in the toroidal molecule is changed such that second ones of the sixfold rings arranged on an inner wall surface of the toroidal molecule are replaced by second fivefold rings each including five atoms and sevenfold rings each including seven atoms. The second sixfold rings are apart from each other, and each of the first and second fivefold rings and the sevenfold rings is surrounded by the sixfold rings.

Alternatively, for constructing a toroidal molecule, a toroidal molecule is formed such that a plurality of first sixfold rings each including six atoms are arranged in a torus form, while changing external physical force to be applied to the atoms. Then the atoms arrangement in the toroidal molecule is changed such that some of the first sixfold rings arranged on an outer wall surface of the toroidal molecule are replaced by second sixfold rings each including six atoms and having a size larger than that of each of the first sixfold rings. Also, the atoms arrangement in the toroidal molecule is changed such that some of the first sixfold rings arranged on an inner wall surface of the toroidal molecule are replaced by the second sixfold rings and third sixfold rings each including six atoms and having a size smaller than the size of each of said first sixfold rings. Each of the second and third sixfold rings is surrounded by the first sixfold rings.

This is achieved by moving atoms one by one using the electric field created by the tip of a probe of a scanning microscope in the environment below $10^{-10}$ Torr. The other method is the discharge arc: Torus may be obtained as the small-length tubes in a carbon-arc chamber similar to that used for the $C_{60}$ (fullarene) production. The vertical electrodes are installed in the center of the chamber. The anode is a graphitic carbon rod, and the cathode has a shallow dimple used to hollow a small piece of Fe (iron), Co (Cobalt) or/and Ni (Nickel), during evaporation. The evaporation chamber is filled with rare gas of 10 Torr to 500 Torr. The carbon discharge is started by flowing current of 95 to 200 A upon application of voltage of 20 V between the electrodes. The temperature of the chamber is controlled 300 degree to 1300 degree in Celsius. The rapid quenching laser is performed to weaken the crystal growth.

The structures described above can be also achieved by using other stratified materials such as boron (B), phosphorus (P), tungsten (W), etc. than carbon.

According to the present invention, novel topological properties which could not be given to conventional carbon can be given to carbon atoms so that the conventional method of use of carbon elements can be widened.

What is claimed is:

1. A method for constructing a toroidal molecule, comprising the steps of:
   forming a toroidal molecule such that a plurality of sixfold rings each including six atoms are arranged in a torus form, while changing external physical force to be applied to the atoms;
   changing the atoms arrangement of said toroidal molecule such that first ones of said sixfold rings arranged on an outer wall surface of said toroidal molecule are replaced by first fivefold rings each including five atoms, said first sixfold rings being apart from each other; and
   changing the atoms arrangement of said toroidal molecule such that second ones of said sixfold rings arranged on an inner wall surface of said toroidal molecule are replaced by second fivefold rings each including five atoms and sevenfold rings each including seven atoms, said second sixfold rings being apart from each other,
   wherein each of said first and second fivefold rings and said sevenfold rings is surrounded by said sixfold rings.

2. A method according to claim 1, further comprising the steps of:
   arranging a plurality of toroidal molecules on a substrate material one-, two- or three-dimensionally to form a crystal of said toroidal molecules; and
   changing sizes of said toroidal molecules spatially to construct a cluster of carbon molecules.

3. A method according to claim 1, further comprising the steps of:
   making a hole of said toroidal molecule to adsorb another atom/molecule; and
   identifying an atom/molecule having a size fitted to the hole of said toroidal molecule.

4. A method according to claim 1, further comprising the steps of:
   making a hole of said toroidal molecule to adsorb another atom/molecule; and
   detecting a pressure from change of electric characteristics of said toroidal molecule.

5. A method according to claim 1, further comprising the steps of:
   making a hole of said toroidal molecule to adsorb another atom; and
   taking said other atom from a part of the torus into said toroidal molecule.

6. A method according to claim 1, further comprising the steps of:
   making a hole of said toroidal molecule to adsorb another atom; and
   taking said other atom from a gap between the atoms of the torus into said toroidal molecule.

7. A method according to claim 1, further comprising the steps of:
   making a hole of said toroidal molecule to absorb another slender molecule; and
   passing said another slender molecule through said hole of said toroidal molecule.

8. A method according to claim 1, further comprising the steps of:
   making holes of a plurality of toroidal molecules, each said toroidal molecule having one hole, to adsorb other molecules; and
   passing said other molecules through said holes of said plurality of said toroidal molecules, respectively; and
   engaging concave portions of said outer wall surfaces of said toroidal molecules with convex portions thereof.

9. A method according to claim 1, further comprising the steps of:
   changing the number of atoms constituting said toroidal molecule; and
   changing energy band structure of electrons/holes of said atoms in said toroidal molecule to respond to specific light.

10. A method according to claim 1, further comprising the steps of:
    making a hole of said toroidal molecule to adsorb another molecule; and
    making said another molecule to block said hole of said toroidal molecule; and
    radiating a neutron beam or gamma ray onto a portion of said hole for a chemical reaction or nuclear reaction to give to said hole-blocking molecule kinetic energy for elutriation of the hole-blocking molecule from said toroidal molecule.

11. A method according to claim 1, further comprising the steps of:
    providing a lead wire in a vicinity of said toroidal molecule; and
    supplying electric field from said lead wire to said toroidal molecule to change electron distribution in said toroidal molecule.

12. A method according to claim 1, further comprising the steps of:
    bringing a probe of a scanning tunneling microscope close to a vicinity of said toroidal molecule; and
    supplying electric field from said probe to said toroidal molecule to change electron distribution in said toroidal molecule.

13. A method according to claim 1, further comprising the steps of:
    making a hole of said toroidal molecule to adsorb another molecule; and
    heating said toroidal molecule to change a size of said hole of said toroidal molecule;
    passing said another molecule through said hole; and
    quenching said toroidal molecule to reduce the size of said hole to chop said other molecule.

14. A method according to claim 1, further comprising the steps of:
  combining a plurality of said toroidal molecules; and
  adding impurities to said toroidal molecules to give magnetization thereto.

15. A method according to claim 1, further comprising the steps of:
  making a hole of said toroidal molecule to adsorb another molecule; and
  passing said another slender molecule through said hole of said toroidal molecule; and
  spinning said toroidal molecule around said slender molecule.

16. A method according to claim 1, further comprising the step of:
  combining a plurality of toroidal molecules while changing bondings of the atoms by locally applying said external physical force to said plurality of said toroidal molecules to form a cluster of carbon molecules.

17. A method according to claim 16, further comprising the step of:
  forming a molecular machine by using the cluster.

18. A method according to claim 1, further comprising the steps of:
  catching by a probe of a scanning tunneling microscope, a specific fivefold ring of a spheroidal carbon molecule having a surface constituted by sixfold, fivefold and sevenfold rings each including a plurality of carbon atoms, the fivefold rings including the specific fivefold ring; and
  pressing by said probe, said specific fivefold ring down to another fivefold ring in a position symmetrical with said specific fivefold ring with respect to a center of said spheroidal carbon molecule to form said toroidal molecule.

19. A method according to claim 1, further comprising the step of:
  arranging said atoms one by one by using a scanning tunneling microscope to form said toroidal molecule.

20. A method for constructing a toroidal molecule, comprising the steps of:
  forming a toroidal molecule such that a plurality of first sixfold rings each including six atoms are arranged in a torus form, while changing external physical force to be applied to the atoms;
  changing the atoms arrangement of said toroidal molecule such that some of said first sixfold rings arranged on an outer wall surface of said toroidal molecule are replaced by second sixfold rings each including six atoms and having a size larger than that of each of said first sixfold rings; and
  changing the atoms arrangement of said toroidal molecule such that some of said first sixfold rings arranged on an inner wall surface of said toroidal molecule are replaced by said second sixfold rings and third sixfold rings each including six atoms and having a size smaller than the size of each of said first sixfold rings, and
  wherein each of said second and third sixfold rings is surrounded by said first sixfold rings.

21. A method for constructing a helically-coiled molecule, comprising the steps of:
  (a) forming a helically-coiled molecule such that a plurality of sixfold rings each including six atoms are cylindrically arranged and connected to one after another, while changing external physical force to be applied to the atoms;
  (b) changing the arrangement of the atoms of said helically-coiled molecule such that first ones of said sixfold rings arranged on an outer wall surface of said helically-coiled molecule are replaced by first fivefold rings each including five atoms; and
  (c) changing the arrangement of the atoms of said helically-coiled molecule such that second ones of said sixfold rings arranged on an inner wall surface of said helically-coiled molecule are replaced by second fivefold rings each including five atoms and sevenfold rings each including seven atoms, and
  wherein each of said first and second fivefold rings and said sevenfold rings is surrounded by said sixfold rings.

22. A method according to claim 21, further comprising the step of:
  forming a spring of a molecular machine by using said helically-coiled molecule.

23. A method according to claim 21, further comprising the steps of:
  forming a twist, in accordance with information to be written, to a first helically-coiled molecule by using a second helically-coiled molecule; and
  reading a state of twist of said first helically-coiled molecule written in accordance with said information, by using said second helically-coiled molecule.

24. A method according to claim 21, further comprising the step of:
  combining a plurality of helically-coiled molecules and a plurality of other molecules to form a molecular machine.

25. A method according to claim 21, further comprising the step of:
  supplying an electric current to said helically-coiled molecule to form a solenoid coil.

26. A method according to claim 25, further comprising the step of:
  forming a molecular machine by using said helically-coiled molecule.

27. A method according to claim 21, further comprising the step of:
  reducing helical and cylindrical diameters of said helically-coiled molecule with approach of a helical tip thereof to form a molecular spring.

28. A method according to claim 21, further comprising the step of:
  adding atoms such as nitrogen atoms or boron atoms to said helically-coiled molecule.

* * * * *